(12) United States Patent
Nomura et al.

(10) Patent No.: US 10,175,551 B2
(45) Date of Patent: *Jan. 8, 2019

(54) LIGHT CONTROL FILM

(75) Inventors: Satoyuki Nomura, Tsukuba (JP); Yoshii Morishita, Tsukuba (JP); Tooru Tanaka, Tsukuba (JP); Shigeshi Ohno, Chikusei (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/148,956

(22) PCT Filed: Feb. 9, 2010

(86) PCT No.: PCT/JP2010/051892
§ 371 (c)(1),
(2), (4) Date: Aug. 11, 2011

(87) PCT Pub. No.: WO2010/092954
PCT Pub. Date: Aug. 19, 2010

(65) Prior Publication Data
US 2011/0310463 A1 Dec. 22, 2011

(30) Foreign Application Priority Data
Feb. 13, 2009 (JP) .................. 2009-031219

(51) Int. Cl.
 B32B 5/00 (2006.01)
 G02F 1/17 (2006.01)
 G02F 1/1334 (2006.01)
(52) U.S. Cl.
 CPC ............ *G02F 1/172* (2013.01); *G02F 1/1334* (2013.01); *G02F 2202/28* (2013.01)
(58) Field of Classification Search
None
See application file for complete search history.

(56) References Cited

U.S. PATENT DOCUMENTS

| | | |
|---|---|---|
| 1,955,923 A | 4/1934 | Land |
| 1,963,496 A | 6/1934 | Land |
| 2,041,138 A | 5/1936 | Land |
| 2,306,108 A | 12/1942 | Land |
| 2,375,963 A | 5/1945 | Thomas |
| 3,756,700 A | 9/1973 | Saxe |
| 3,772,874 A | 11/1973 | Lefkowitz |

(Continued)

FOREIGN PATENT DOCUMENTS

| | | |
|---|---|---|
| AU | 2009283543 A1 | 2/2010 |
| AU | 2009283543 B2 | 2/2010 |

(Continued)

OTHER PUBLICATIONS

Machine translation of JP2002-189123 (2002).*

(Continued)

*Primary Examiner* — Samir Shah
(74) *Attorney, Agent, or Firm* — Fitch, Even, Tabin, & Flannery, L.L.P.

(57) ABSTRACT

There is provided a light control film having two transparent electroconductive resin substrates; and a light control layer sandwiched between the two transparent electroconductive resin substrates, the light control layer containing; a resin matrix; and a light control suspension dispersed in the resin matrix, wherein at least one of the transparent electroconductive resin substrates has, on the light control layer side thereof, a primer layer, and the primer layer is made of a thin film in which metal oxide fine particles are dispersed in an organic binder resin. The light control film may have the function improving adhesion between the film matrix and each substrates and performing stable light control function.

23 Claims, 2 Drawing Sheets

(56) References Cited

U.S. PATENT DOCUMENTS

| | | | |
|---|---|---|---|
| 3,912,365 | A | 10/1975 | Lowell |
| 4,078,856 | A | 3/1978 | Thompson et al. |
| 4,247,175 | A | 1/1981 | Saxe |
| 4,270,841 | A | 6/1981 | Saxe |
| 4,273,422 | A | 6/1981 | Saxe |
| 4,407,565 | A | 10/1983 | Saxe |
| 4,422,963 | A | 12/1983 | Thompson et al. |
| 5,463,491 | A * | 10/1995 | Check, III ............. 359/296 |
| 5,639,546 | A | 6/1997 | Bilkadi |
| 5,935,683 | A | 8/1999 | Iiyama et al. |
| 6,271,956 | B1 | 8/2001 | Saxe |
| 6,368,680 | B1 | 4/2002 | Kubota et al. |
| 6,480,322 | B2 | 11/2002 | Engler et al. |
| 6,987,602 | B2 | 1/2006 | Saxe |
| 7,273,422 | B2 | 9/2007 | Saxe |
| 8,687,263 | B2 | 4/2014 | Nomura |
| 2002/0131149 | A1 | 9/2002 | Engler et al. |
| 2003/0107797 | A1 | 6/2003 | Saxe |
| 2004/0115445 | A1 | 6/2004 | Sasaki et al. |
| 2004/0145562 | A1 | 7/2004 | Horikiri |
| 2006/0033981 | A1 | 2/2006 | Chaug |
| 2008/0280149 | A1* | 11/2008 | Higuchi ............. C08L 83/04 428/447 |
| 2009/0316254 | A1* | 12/2009 | Higashida ............. G02F 1/172 359/296 |
| 2010/0309544 | A1 | 12/2010 | Nomura et al. |
| 2011/0217546 | A1* | 9/2011 | Nomura et al. ............. 428/336 |

FOREIGN PATENT DOCUMENTS

| | | |
|---|---|---|
| EP | 0081308 | 6/1983 |
| EP | 2124097 | 11/2009 |
| EP | 2239601 | 10/2010 |
| EP | 2 322 985 | 5/2011 |
| GB | 433455 | 8/1935 |
| JP | 58-116517 | 7/1983 |
| JP | 64-51916 | 3/1989 |
| JP | 04-335326 | 11/1992 |
| JP | 05-27271 | 2/1993 |
| JP | 05-273528 | 10/1993 |
| JP | 06-118203 * | 4/1994 |
| JP | 7-219697 | 8/1995 |
| JP | 7-296672 | 11/1995 |
| JP | 09-001963 | 1/1997 |
| JP | 2001-083554 | 3/2001 |
| JP | 2002-80754 | 3/2002 |
| JP | 2002-181923 | 7/2002 |
| JP | 2002-189123 | 7/2002 |
| JP | 2002-287884 | 10/2002 |
| JP | 2003-525468 | 8/2003 |
| JP | 2005-32624 A | 2/2005 |
| JP | 2005-533289 | 11/2005 |
| JP | 2006-505013 | 2/2006 |
| JP | 2006-124572 | 5/2006 |
| JP | 2008-158043 | 7/2008 |
| JP | 5104954 B2 | 12/2012 |
| WO | WO 2001/065299 | 9/2001 |
| WO | WO 2004/010206 | 1/2004 |
| WO | 2004/042464 A3 | 5/2004 |
| WO | WO 2004/088395 | 10/2004 |
| WO | WO 2008/075772 | 6/2008 |
| WO | WO2008/075772 * | 6/2009 |
| WO | 2009/093657 A1 | 7/2009 |
| WO | WO 2010/021275 A1 | 2/2010 |
| WO | WO 2010/021276 | 2/2010 |

OTHER PUBLICATIONS

Product Information UV Cure Resin coating Dow Corning Toray AY 42-151 (Sep. 2007).*
Machine translation of JP06-118203 (1994).*
An International Preliminary Report on Patentability dated Sep. 22, 2011 in English.
Communication dated Jun. 15, 2012, for European Patent Application No. 10741231.4; 6 pages; European Patent Office; Munich, Germany.
Communication dated Sep. 2, 2013, in connection with Australian Application No. 2010214432, 4 pages, Australian Patent Office, Australia.
Communication dated Feb. 14, 2013 in connection with European Patent Application No. 10 741 231.4-1904, 3 pages; European Patent Office.
Communication dated Oct. 1, 2013, in connection with Japanese Patent Application No. 2010-550521, 2 pages, Japanese Patent Office, Japan.
Communication dated May 27, 2014, in connection with Japanese Patent Application No. 2010-550521, 2 pages; Japanese Patent Office, Japan.
Communication dated Jul. 28, 2015, for Japanese Application No. 2014-193765; together with English language translation thereof.
Decision of Refusal dated Feb. 23, 2016, for Japanese Application No. 2014-193765, together with English language translation thereof.
Australian Office Action of Application No. 2009283544 dated Jul. 18, 2012 in English.
Australian Search Report in English dated Oct. 14, 2011.
Burridge, "Chemical Profile: Pentaerythirtol" ICIS Chemical Business, Nov. 12-18, 2007, p. 46.
English translation of International Preliminary Examination Report on Patentability dated Sep. 22, 2011.
English translation of International Preliminary Report dated Mar. 17, 2011.
EP Search Report of Application No. 09808211.8 dated Dec. 29, 2011.
EP Search Report of Application No. 09808212.6 dated Dec. 29, 2011.
Final Office Action in U.S. Appl. No. 13/059,542 dated Jan. 24, 2014.
Final Office Action in U.S. Appl. No. 13/059,542 dated Nov. 20, 2012.
Final Office Action in U.S. Appl. No. 13/059,555 dated Jan. 27, 2014.
Final Office Action in U.S. Appl. No. 13/059,555 dated Nov. 19, 2012.
Final Office Action in U.S. Appl. No. 14/166,923 dated Apr. 18, 2017.
Final Office Action in U.S. Appl. No. 14/166,923 dated Oct. 16, 2015.
Gierenz et al. "Adhesives and Adhesive Tapes" Wiley-VCH, 2001 ISBN 3527301100, pp. 12, 13 and 44.
Japanese Office Action of Application No. 2010-550520 dated Jan. 7, 2014, with English translation.
JP Office Action of Application No. 2010-550520 dated May 7, 2013 with English translation.
JP Office Action of Application No. 2014-078680 dated Dec. 16, 2014 with English translation.
Non-Final Office Action in U.S. Appl. No. 13/059,542 dated Jun. 27, 2013.
Non-Final Office Action in U.S. Appl. No. 13/059,542 dated May 22, 2012.
Non-Final Office Action in U.S. Appl. No. 13/059,555 dated Jun. 28, 2013.
Non-Final Office Action in U.S. Appl. No. 13/059,555 dated Jun. 6, 2012.
Non-Final Office Action in U.S. Appl. No. 14/166,923 dated Aug. 4, 2016.
Non-Final Office Action in U.S. Appl. No. 14/166,923 dated Dec. 23, 2014.
Office Action dated Sep. 27, 2016 for Japanese Application No. 2015-216497 together with English translation.
Office Action of EP Application No. 09808212.6-1904 in counterpart dated Jul. 15, 2015.
Office Action of Japanese Application No. 2014-078680 dated Aug. 4, 2015 with English translation.
The Extended European Search Report for European Patent Application No. 10741230.6-1568 dated Nov. 8, 2017.
Pentaerythritol chemical structure (no date available).

(56) References Cited

OTHER PUBLICATIONS

Non-Final Office Action in U.S. Appl. No. 13/148,962 dated Feb. 27, 2013.
Machine translation of JP 06-118203.

* cited by examiner (a)  (b)

(a)

(b)

LIGHT CONTROL FILM

TECHNICAL FIELD

The present invention relates to a light control film having a light control function.

BACKGROUND ART

Light control glass containing a light control suspension was first invented by Edwin Land. The form thereof has a structure wherein a light control suspension in a liquid state is injected between two transparent electroconductive substrates having a narrow gap (see, for example, Patent Documents 1 and 2). According to Edwin Land's invention, in the state that no electric field is applied to the liquid light control suspension, which is injected between the two transparent electroconductive substrates, the great majority of light radiated thereinto is reflected, scattered or absorbed on/in the light control particles dispersed in the suspension by Brownian movement of the light control particles. Only an extremely small portion thereof is transmitted therethrough.

In other words, the degree of the transmission, reflection, scattering or absorption is decided in accordance with the shape, nature and concentration of the light control particles dispersed in the light control suspension, and the energy quantity of the radiated light. When an electric field is applied to a light control window wherein light control glass having the above-mentioned structure is used, the field is passed through the transparent electroconductive substrates so that an electric field is formed in the light control suspension. The light control particles, which show a light control function, are polarized so that the particles are arranged in parallel to the electric field. As a result, light is transmitted between the light control particles. Finally, the light control glass turns transparent. However, such an initial light control device has not easily been put into practice use because of aggregation of the light control particles in the light control suspension, sedimentation thereof based on the weight of the particles themselves, change in the color phase on the basis of heat, change in the optical density, deterioration based on the radiation of ultraviolet rays, difficulties in keeping up the gap between the substrates and in the injection of the light control suspension into the gap, and others.

Rober L. Saxe, F. C. Lowell or R. I. Thompson discloses a light control window using light control glass which compensates for problems of initial light control windows, that is, the aggregation and sedimentation of light control particles, a change in the optical density, and others (see, for example, Patent Documents 3 to 9). According to these patents and others, use is made of a liquid-state light control suspension composed of light control crystal particles in a needle form, a suspending agent for dispersing the crystal particles, a dispersion adjustor, a stabilizer and others to make the density of the light control particles substantially equal to that of the suspending agent, whereby the sedimentation of the light control particles is prevented while the addition of the dispersion adjustor makes the dispersibility of the light control particles high. In this way, the aggregation of the light control particles is prevented so that the initial problems are solved.

However, the light control glass has a structure wherein a light control suspension in a liquid state is sealed into a gap between two transparent electroconductive substrates, similarly to any conventional light control glass; thus, when a large-size product is produced, it is difficult to seal the suspension evenly into the gap between the two transparent electroconductive substrates, so that there remains a problem that a difference in hydraulic pressure between the upper and lower regions of the product easily causes an expansion phenomenon of the lower region. Additionally, in accordance with the external environment, for example, the pressure of wind, the gap between the substrates is changed, so that the following problem is caused: the optical density is changed so that the color phase becomes uneven; or a sealing member, in the surroundings, for storing liquid between the transparent electroconductive substrates is broken so that the light control material leaks. Moreover, the response time becomes uneven, by a deterioration based on ultraviolet rays, or a drop in the voltage between the circumferential region and the center region, of the transparent electroconductive substrates.

As a method for improving the above, suggested is a method of mixing a liquid light control suspension with a solution of a curable polymeric resin, and using a phase-separation method using polymerization, a phase-separation method using solvent-volatilization, a phase-separation method depending on temperature, or some other method to produce a film (see, for example, Patent Document 10).

PRIOR ART DOCUMENTS

Patent Documents

Patent Document 1: U.S. Pat. No. 1,955,923
Patent Document 2: U.S. Pat. No. 1,963,496
Patent Document 3: U.S. Pat. No. 3,756,700
Patent Document 4: U.S. Pat. No. 4,247,175
Patent Document 5: U.S. Pat. No. 4,273,422
Patent Document 6: U.S. Pat. No. 4,407,565
Patent Document 7: U.S. Pat. No. 4,422,963
Patent Document 8: U.S. Pat. No. 3,912,365
Patent Document 9: U.S. Pat. No. 4,078,856
Patent Document 10: JP-A-2002-189123

DISCLOSURE OF THE INVENTION

Technical Problems

However, about the polymeric resin, which is to be cured to become a film matrix, the molecular design thereof is not considered in light of the adhesiveness to any transparent electroconductive substrate. Thus, poor is the adhesiveness between the film matrix and substrates such as PET films each having a surface on which a electroconductive thin film made of ITO or the like is formed, so that there remains a problem that the film matrix is extremely easily peeled from the substrates.

An object of the invention is to provide a light control film wherein the adhesiveness between a film matrix and substrates is improved to exhibit a stable light control function.

Solution to Problem

The inventors have made eager investigations so as to find out that the above-mentioned problems can be solved by laying a specified primer layer on the light control-layer-side surface of at least one of transparent electroconductive resin substrates.

Accordingly, the invention relates to a light control film comprising: two transparent electroconductive resin substrates; and a light control layer sandwiched between the two transparent electroconductive resin substrates, the light control layer containing: a resin matrix; and a light control suspension dispersed in the resin matrix, wherein at least one of the transparent electroconductive resin substrates has, on the light control layer side thereof, a primer layer, and the primer layer is made of a thin film in which metal oxide fine particles are dispersed in an organic binder resin.

It is preferred that the metal oxide fine particles have an average particle diameter of 100 nm or less.

It is more preferred that the metal oxide fine particles are contained in a proportion of 45 to 95% by mass of the entire materials of the primer layer.

It is preferred that this primer layer is made of a thin film obtained by curing a polymerizable monomer or oligomer as the organic binder resin by heat or light.

It is preferred that the organic binder resin of this primer layer is made partially of a thin film composed of a (meth) acrylate or an epoxy, or the two.

It is also preferred that the metal oxide fine particles are selected from the group consisting of $ZrO_2$, $SiO_2$, ITO, GZO, ZnO, and a mixture thereof.

In the invention, the film thickness of the primer layer is preferably 500 nm or less.

Advantageous Effects of the Invention

The light control film of the invention is high in the adhesiveness between the light control layer and the transparent electroconductive resin substrates so that the film can exhibit a stable light control function.

The disclosure of the present application is related to the subject matters described in Japanese Patent Application No. 2009-031219 filed on Feb. 13, 2009, and the contents disclosed therein are incorporated herein by reference.

BEST MODE FOR CARRYING OUT THE INVENTION

Figure 1:
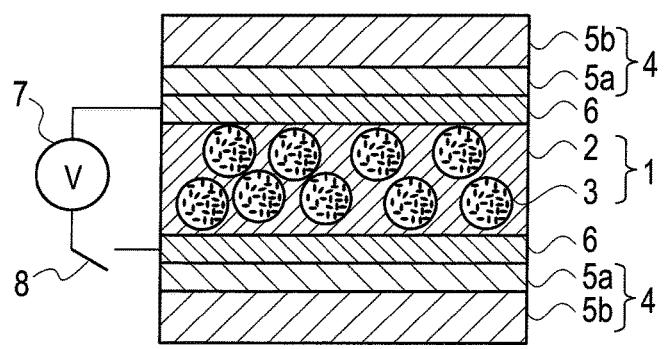
FIG. 1 is a schematic view of a sectional structure of an embodiment of the light control film of the invention.

The light control film of the invention is a light control film wherein a light control layer containing a resin matrix and a light control suspension dispersed in the resin matrix is sandwiched between two transparent electroconductive resin substrates, characterized in that a specified primer layer is laid on a surface of at least one of the transparent electroconductive resin substrates, the surface being a surface contacting the light control layer.

The light control layer can be generally formed by use of a light control material. The light control material in the invention contains the following: a polymeric medium that is irradiated with an energy ray to be cured, as a resin matrix; and a light control suspension wherein light control particles are dispersed in a dispersing medium in the state that the particles can flow. It is preferred that the dispersing medium in the light control suspension can undergo phase separation from the polymeric medium and a cured product thereof.

The light control film of the invention is yielded by using the light control material and by sandwiching the light control layer, wherein the light control suspension is dispersed in the resin matrix made of the polymeric medium, between the two transparent electroconductive resin substrates which each have a surface subjected to primer treatment and contacting the light control layer, or between the two transparent electroconductive resin substrates only one of which has a surface subjected to primer treatment and contacting the light control layer.

In other words, in the light control layer of the light control film of the invention, the light control suspension, which is in a liquid state, is dispersed in the form of fine droplets in the resin matrix, which is in a solid state and is obtained by curing the polymeric medium. The light control particles contained in the light control suspension are preferably in the form of rods or needles.

When an electric field is applied to the light control film, the light control particles having an electric dipole moment, which are floated and dispersed in the droplets of the light control suspension dispersed in the resin matrix, are arranged in parallel to the electric field, whereby the droplets are converted to the state of being transparent to incident light, so that the film transmits the incident light in the state that the light is hardly scattered in accordance with the viewing angle or the transparency is hardly declined. In the invention, a light control layer is laid onto a specified primer layer to form a film, thereby solving problems of any conventional light control film, that is, problems that the adhesiveness between the light control layer and the transparent electroconductive resin substrates is weak so that the light control layer is peeled from the transparent electroconductive resin substrates in the production steps, the working steps after the production of the film, or some other steps.

In the invention, the primer layer is preferably a thin film in which metal oxide fine particles are dispersed in an organic binder resin.

This primer layer is preferably made of a thin film obtained by curing a polymeric monomer or oligomer as the organic binder resin by heat or light. Furthermore, it is preferred that this polymeric monomer or oligomer is partially a (meth)acrylate. It is also preferred that this polymeric monomer or oligomer is partially an epoxy. This polymeric monomer or oligomer may be partially a mixture of a (meth)acrylate and an epoxy.

The metal oxide fine particles are selected from the group consisting of $ZrO_2$, $SiO_2$, ITO, $TiO_2$, ZnO, $Al_2O_3$, GZO, cobalt blue, $CeO_2$, $BiO_3$, CoO, CuO, $FeO_3(\alpha)$, $Fe_2O_3(\gamma)$, $HO_2O_3$, $Mn_3O_4$, $SnO_2$, $Y_2O_3$, AZO, MgO, and $Co_3O_4$, and they may be used alone, or in the form of a mixture of some species of these metal oxide fine particle species. The fine particles are preferably selected from the group consisting of $ZrO_2$, $SiO_2$, ITO, GZO, ZnO, and a mixture thereof.

About the metal oxide fine particles in the invention, the average particle diameter thereof is preferably 100 nm or less, more preferably 50 nm or less in order not to cause an increase in the haze of the light control film.

In the invention, the average particle diameter is the particle diameter obtained by making a calculation in accordance with the following equation, using the specific surface area measured by means of a specific surface area measuring device according to the BET method:

the average particle diameter (nm)=6000/(the density [g/cm$^3$]×the specific surface area [m$^2$/g])

It is advisable to select metal oxide fine particles having an average particle diameter within the above-mentioned range appropriately from commercially available products.

The organic binder resin in which the metal oxide fine particles are to be dispersed is not particularly limited as far as a film is easily formed from a solution of the binder resin. The wording "easily formed from a solution of the binder resin" means that when the metal oxide fine particles are mixed with the organic binder, the precipitation of the metal oxide fine particles or phase separation is not easily caused. In short, the organic binder is sufficient to be compatible with the metal oxide fine particles.

By dispersing the metal oxide fine particles into the organic binder resin in the invention, the adhesiveness between the transparent electroconductive resin substrates and the light control layer can be made high. Therefore, the organic binder resin, in which the metal oxide fine particles are dispersed, itself does not need to have an effect of improving the adhesiveness between the light control film and the transparent electroconductive resin substrates.

The organic binder resin may be a polymerizable monomer or oligomer. The polymerizable monomer or oligomer may be a (meth)acrylate.

Specific examples of the (meth)acrylate as the polymerizable monomer or oligomer include ethylene glycol dimethacrylate, diethylene glycol dimethacrylate, triethylene glycol dimethacrylate, tetraethylene glycol dimethacrylate, nonaethylene glycol dimethacrylate, tetradecaethylene glycol dimethacrylate, 1,4-butanediol dimethacrylate, neopentyl glycol dimethacrylate, 1,6-hexanediol dimethacrylate, 1,9-nonanediol dimethacrylate, 1,10-decanediol dimethacrylate, dimethyloltricyclodecane dimethacrylate, dimethacrylate of an ethylene oxide adduct of bisphenol A, trimethylolpropane trimethacrylate, triethylene glycol diacrylate, tetraethylene glycol diacrylate, nonaethylene glycol diacrylate, tetradecaethylene glycol diacrylate, polytetramethylene glycol diacrylate, neopentyl glycol diacrylate, 3-methyl-1,5-pentanediol diacrylate, 1,6-hexanediol diacrylate, 2-butyl-2-ethyle-1,3-propanediol diacrylate, 1,9-nonadiol diacrylate, dimethyloltricyclodecane diacrylate, diacrylate of an ethylene oxide adduct of bisphenol A, diacrylate of a propylene oxide adduct of bisphenol A, trimethylolpropane acrylate benzoate, neopentylglycol hydroxypivalate diacrylate, trimethylolpropane triacrylate, ethylene oxide modified trimethylolpropane triacrylate, propylene oxide modified trimethylolpropane triacrylate, pentaerythritol tetraacrylate, dipentaerythritol hexaacrylate, isocyanuric acid ethylene oxide modified triacrylate, polypropene glycol diacrylate, polyethylene glycol diacrylate, ε-caprolactone modified tris(acryloxyethyl)isocyanurate, phenylglycidyl ether acrylate urethane prepolymer, and the like, which may be used alone or in the form of a mixture. The invention is not limited to these examples.

Examples of commercially available products of these (meth)acrylates include LIGHT ESTER EG, LIGHT ESTER 2EG, LIGHT ESTER 3EG, LIGHT ESTER 4EG, LIGHT ESTER 9EG, LIGHT ESTER 14EG, LIGHT ESTER 1,4BG, LIGHT ESTER NP, LIGHT ESTER 1,6HX, LIGHT ESTER 1,9ND, LIGHT ESTER 1,10DC, LIGHT ESTER DCP-M, LIGHT ESTER BP-2EMK, LIGHT ESTER BP-4EM, LIGHT ESTER BP-6EM, LIGHT ESTER TPM, LIGHT ACRYLATE 3EG-A, LIGHT ACRYLATE 4EG-A, LIGHT ACRYLATE 9EG-A, LIGHT ACRYLATE 14EG-A, LIGHT ACRYLATE PTMGA-250, LIGHT ACRYLATE NP-A, LIGHT ACRYLATE MPD-A, LIGHT ACRYLATE 1,6HX-A, LIGHT ACRYLATE BEPG-A, LIGHT ACRYLATE 1,9ND-A, LIGHT ACRYLATE MOD-A, LIGHT ACRYLATE DCP-A, LIGHT ACRYLATE BP-4EA, LIGHT ACRYLATE BP-4PA, LIGHT ACRYLATE BA-134, LIGHT ACRYLATE BP-10EA, LIGHT ACRYLATE HPP-A, LIGHT ACRYLATE TMP-A, LIGHT ACRYLATE TMP-3EO-A, LIGHT ACRYLATE TMP-6EO-3A, LIGHT ACRYLATE PE-4A, LIGHT ACRYLATE DPE-6A, AT-600, and AH-600, each of which is manufactured by Kyoeisha Chemical Co., Ltd.; and ARONIX M-215, ARONIX M-220, ARONIX M-225, ARONIX M-270, ARONIX M-240, ARONIX M-310, ARONIX M-321, ARONIX M-350, ARONIX M-360, ARONIX M-370, ARONIX M-315, ARONIX M-325, and ARONIX M-327, each of which is manufactured by Toagosei Co., Ltd.

The content by percentage of the metal oxide fine particles in the primer layer is from 4.5 to 95% by mass of the whole of the materials of the primer layer (the whole of the dried and cured primer layer) from the viewpoint of a restraint of a rise in the haze of the light control film.

When the metal oxide fine particles are used in the primer layer, the primer layer can be formed to have a high hardness, thereby producing advantageous effects that an improvement is made in the adhesiveness between the light control film and the transparent electroconductive resin substrates, as well as at the time of peeling the light control film to take out the electrode, the underlying transparent electroconductive film is not easily damaged.

When the metal oxide fine particles are used in the primer layer, there is produced an advantageous effect that the tackiness of the primer layer can be made small.

When the polymerizable monomer or oligomer is used to form the primer layer, it is preferred to use a thermopolymerization initiator or photopolymerization initiator to cure the monomer or oligomer, thereby forming the thin film. The method for thermocuring or photocuring is not particularly limited, and any ordinary curing method may be used as the method.

The thermopolymerization initiator used in the invention may be any agent that is discomposed by heat, so as to generate radicals, thereby making it possible to start the polymerization of a polymerizable compound. Radical initiators useful therefor are known initiators, examples thereof include organic peroxides, azonitriles and the like. However, the initiator is not limited thereto. Examples of the organic peroxides include alkyl peroxides, aryl peroxides, acyl peroxides, aroyl peroxides, ketone peroxides, peroxycarbonates, peroxycarboxylates and the like.

Examples of the alkyl peroxides include diisopropyl peroxide, di-tert-butyl peroxide, di-tert-amyl peroxide, tert-butylperoxy-2-ethyl hexanoate, tert-amylperoxy-2-ethyl hexanoate, tert-butyl hydroperoxide and the like.

Examples of the aryl peroxide include dicumyl peroxide, cumyl hydroperoxide and the like. Examples of the acyl peroxides include dilauroyl peroxide and the like.

Examples of the aroyl peroxides include dibenzoyl peroxide and the like.

Examples of the ketone peroxides include methyl ethyl ketone peroxide, cyclohexanone peroxide and the like.

Examples of the azonitriles include azobisisobutyronitrile, azobisisopropylnitirle and the like.

Examples of commercially available products of thermopolymerization initiator include PEROYL IB, PERCUMYL ND, PEROYL NPP, PEROYL IPP, PEROYL SBP, PEROCTA ND, PEROYL TCP, PERROYL OPP, PERHEXYL ND, PERBUTYL ND, PERBUTYL NHP, PERHEXYL PV, PERBUYTL PV, PEROYL 355, PEROYL L, PEROCTA O, PEROYL SA, PERHEXA 25O, PER HEXYL O, NYPER PMB, PERBUTYL O, NYPER BMT, NYPER BW, PERHEXA MC and PERHEXA TMH (each manufactured by NOF Corp.); and azo compounds, in particular, 2,2'-azobis(4-methoxy-2,4-dimethylvaleronitrile), 2,2'-azobis(2,4-dimethylvaleronitrile), 2,2'-azobis(2-methyl-butyronitrile), 2,2'-azobis(N-(2-propenyl)-2-methylpropioneamide) and/or dimethyl 2,2'-azobis(2-methylpropionate), dimethyl 2,2'-azoisobutyrate and the like.

The photopolymerization initiator may be any agent that is decomposed by irradiation with light, so as to generate radicals, thereby making it possible to start the polymerization of a polymerizable compound. Examples thereof include acetophenone, acetophenone benzyl ketal, 1-hydroxycyclohexyl phenyl ketone, 2,2-dimethoxy-2-phenylacetophenone, xanthone, fluorenone, benzaldehyde, anthraquinone, triphenylamine, carbazole, 3-methylacetophenone, 4-chlorobenzophenone, 4,4'-dimethoxybenzophenone, 4,4'-diaminobenzophenone, Michler's ketones, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethylthioxanthone, 2-isopropylthioxanthone, 2-chlorothioxanthone, 2-methyl-1-[4-(methylthio)phenyl]-2-morpholino-propane-1-one, 2,4,6-trimethylbenzoyldiphenylphosphine oxide, bis-(2,6-dimethoxybenzoyl)-2,4,4-trimethylpentylphosphine oxide and the like. However, the initiator is not limited thereto.

Examples of commercially available products of the photopolymerization initiator include IRGACURE 651, IRGACURE 184, IRGACURE 500, IRGACURE 2959, IRGACURE 127, IRGACURE 754, IRGACURE 907, IRGACURE 369, IRGACURE 379, IRGACURE 379EG, IRGACURE 1300, IRGACURE 819, IRGACURE 819DW, IRGACURE 1800, IRGACURE 1870, IRGACURE 784, IRGACURE OXE01, IRGACURE OXE02, IRGACURE 250, IRGACURE PAG103, IRGACURE PAG108, IRGACURE PAG121, IRGACURE PAG203, DAROCURE 1173, DAROCURE MBF, DAROCURE TPO, DAROCURE 4265, DAROCURE EDB, and DAROCURE EHA (each manufactured by Ciba Japan K.K.); C0014, B1225, D1640, D2375, D2963, M1245, B0103, C1105, C0292, E0063, P0211, I0678, P1410, P1377, M1209, F0362, B0139, B1275, B0481, D1621, B1267, B1164, C0136, C1485, I0591, F0021, A0061, B0050, B0221, B0079, B0222, B1019, B1015, B0942, B0869, B0083, B2380, B2381, D1801, D3358, D2248, D2238, D2253, B1231, M0792, A1028, B0486, T0157, T2041, T2042, T1188 and T1608 (each manufactured by Tokyo Chemical Industry Co., Ltd.).

Instead of the above-mentioned (meth)acrylate used as the organic binder in the primer layer, or in combination therewith, the following materials (a) to (c) may be used.

(a) a material containing a (meth)acrylate having a hydroxyl group in the molecule thereof, (b) a material containing an urethane acrylate having a pentaerythritol skeleton, and (c) a phosphoric ester having one or more polymerizable groups in the molecule thereof.

(a) Material Containing a (meth)acrylate Having a Hydroxyl Group in the Molecule Thereof:

Specific examples of the (meth)acrylate having a hydroxyl group in the molecule thereof, used to form the primer layer, are compounds represented by formulae (1) to (8) illustrated below. However, the invention is not limited to these examples.

The (meth)acrylate having a hydroxyl group is more preferably a (meth)acrylate having a hydroxyl group and a pentaerythritol skeleton.

About the "(meth)acrylate having a hydroxyl group and a pentaerythritol skeleton", the following is permissible: as far as the (meth)acrylate has in the molecule a hydroxyl group, all hydroxyl groups of the pentaerythritol are substituted. This wording preferably denotes a (meth)acrylate in which at least one hydroxyl group of the pentaerythritol is unsubstituted.

About the pentaerythritol skeleton, a description will be made in paragraphs about the material (b).

[Chemical Formula 1]

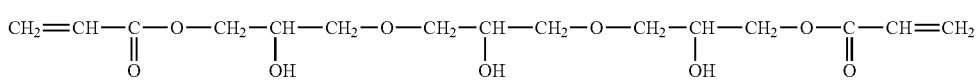
(1)

[Chemical Formula 2]

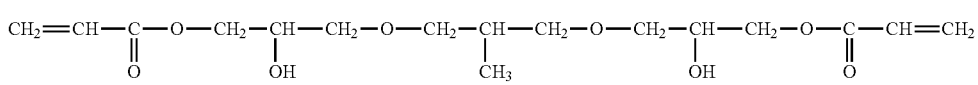
(2)

[Chemical Formula 3]

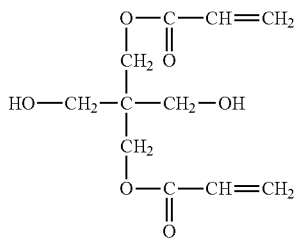
(3)

[Chemical Formula 4]

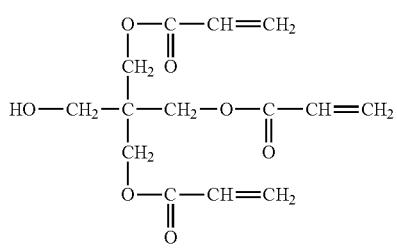
(4)

[Chemical Formula 5]

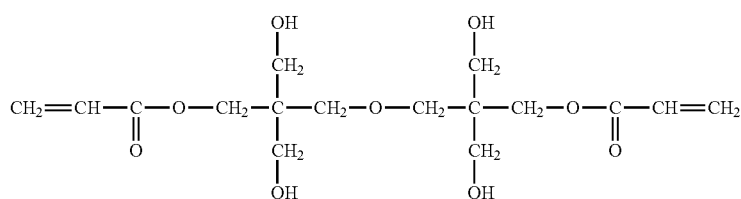

(5)

[Chemical Formula 6]

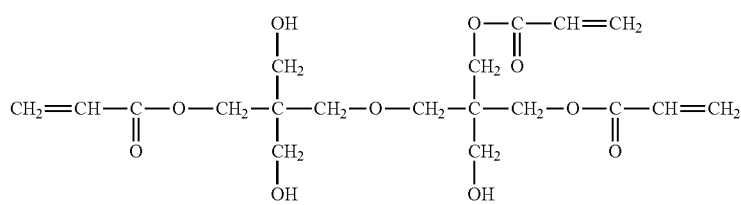

(6)

[Chemical Formula 7]

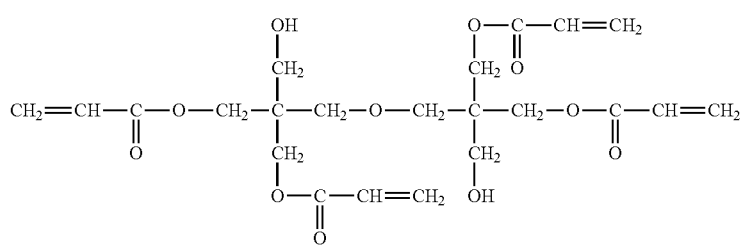

(7)

[Chemical Formula 8]

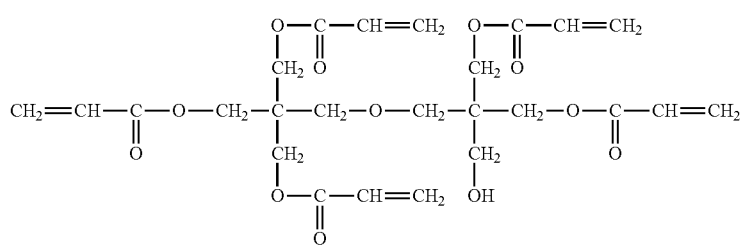

(8)

The (meth)acrylate having a hydroxyl group in the molecule thereof used in the invention, may be synthesized by a known method. In the case of, for example, an epoxy ester, the ester may be yielded by causing an epoxy compound to react with a (meth)acrylic acid in the presence of an esterifying catalyst and a polymerization inhibitor in an inert gas.

Examples of the inert gas include nitrogen, helium, argon, and carbon dioxide. These may be used alone or in combination.

The esterifying catalyst may be, for example, a compound having tertiary nitrogen, such as triethylamine, a pyridine derivative or an imidazole derivative, a phosphorus compound such as trimethylphosphine or triphenylphosphine, an amine salt such as tetramethylammonium chloride or triethylamine, or the like. The addition amount thereof is from 0.000001 to 20% by mass, preferably from 0.001 to 1% by mass.

The polymerization inhibitor may be one that is itself known, such as hydroquinone or tert-butylhydroquinone. The use amount thereof is selected from the range of 0.000001 to 0.1% by mass.

Examples of the epoxy ester include 2-hydroxy-3-phenoxypropyl acrylate (trade name: ARONIX M-5700, manufactured by Toagosei Co., Ltd., or trade name: EPOXY ESTER M-600A, manufactured by Kyoeisha Chemical Co., Ltd.), 2-hydroxy-3-acryloyloxypropyl methacrylate (trade name: LIGHT ESTER G-201P, manufactured by Kyoeisha Chemical Co., Ltd.), a glycerin diglycidyl ether acrylic-acid-adduct (trade name: EPOXY ESTER 80MFA, manufactured by Kyoeisha Chemical Co., Ltd.), and the like.

In the case of the (meth)acrylate having a hydroxyl group and a pentaerythritol skeleton, this ester can be yielded by causing pentaerythritol, dipentaerythritol or the like to react with acrylic acid or methacrylic acid in the air in the presence of an esterifying catalyst and a polymerization inhibitor. The method for reaction for adding acrylic acid or methacrylic acid to pentaerythritol or dipentaerythritol may be a known method described in JP-B-5-86972, JP-A-63-68642, and others.

Examples of commercially available products of the (meth)acrylate having a hydroxyl group in the molecule thereof include, in particular, LIGHT ESTER HOP, LIGHT ESTER HOA, LIGHT ESTER HOP-A, LIGHT ESTER HOB, LIGHT ESTER HO-MPP, LIGHT ESTER P-1M, LIGHT ESTER P-2M, LIGHT ESTER G-101P, LIGHT ESTER G-201P, LIGHT ESTER HOB-A, EPOXY ESTER M-600A, LIGHT ESTER HO-HH, LIGHT ACRYALTEs HOA-HH, HOA-MPL and HOA-MPE, LIGHT ACRYALTE P-1A, LIGHT ACRYALTE PE-3A, EPOXY ESTER 40EM, EPOXY ESTER 70PA, EPOXY ESTER 200PA, EPOXY ESTER 80MFA, EPOXY ESTER 3002M, EPOXY ESTER 3002A, EPOXY ESTER 3000MK, and EPOXY ESTER 3000A, each of which is manufactured by Kyoeisha Chemical Co., Ltd.; ARONIX M-215, ARONIX M-305, ARONIX M-306, ARONIX M-451, ARONIX M-403, ARONIX M-400, ARONIX M402, ARONIX M-404, and ARONIX M-406, each of which is manufactured by Toagosei Co., Ltd.; PM-21, which is manufactured by Nippon Kayaku Co., Ltd.; PHOSMER PP, PHOSMER PE, and PHOSMER M, each of which is manufactured by Uni-Chemical Co., Ltd., and the like.

(b) Material Containing an Urethane Acrylate Having a Pentaerythritol Skeleton:

Herein the wording "pentaerythritol skeleton" denotes a structure represented by the following formula (a). The "urethane acrylate having a pentaerythritol skeleton" specifically has a structure wherein at least one hydrogen atom in the hydroxyl groups of pentaerythritol present in the molecule of the urethane acrylate is substituted for a carbamoyl group and further at least one of the hydroxyl groups is esterified with (meth)acrylic acid. At this time, the carbamoyl group and/or (meth)acrylic acid may also (each) have a substituent. The hydroxyl group substituted for the carbamoyl group and the hydroxyl group esterified with (meth)acrylic acid do not need to be ones bonded to the same pentaerythritol skeleton represented by the following formula (a):

[Chemical Formula 9]

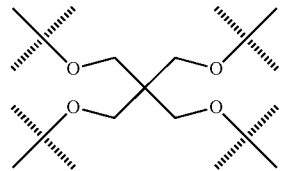

(a)

It is also preferred that the urethane acrylate having a pentaerythritol skeleton in the invention has dipentaerythritol wherein two monopentaerythritol are linked to each other through oxygen as the pentaerythritol skeleton thereof. In this case also, at least one hydrogen atom of the hydroxyl groups of the pentaerythritol is substituted for a carbamoyl group and further at least one of the hydroxyl groups is esterified with (meth)acrylic acid. At this time, the carbamoyl group and/or (meth)acrylic acid may also (each) have a substituent.

Furthermore, it is more preferred that the urethane acrylate also contains IPDI (3-isocyanatomethyl-3,5,5-trimethylcyclohexylisocyanate). It is also preferred that this urethane acrylate contains a hydroxyl group in the molecule thereof.

Herein the "IPDI (3-isocyanatomethyl-3,5,5-trimethylcyclohexylisocyanate) skeleton" denotes a structure represented by the following formula (b):

[Chemical Formula 10]

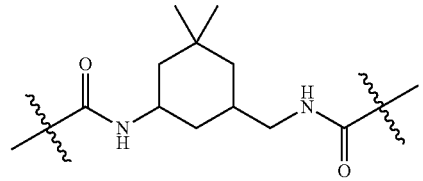

(b)

Specific examples of the urethane acrylate having a pentaerythritol skeleton include compounds represented by the following formulae (9) to (15):

[Chemical Formula 11]

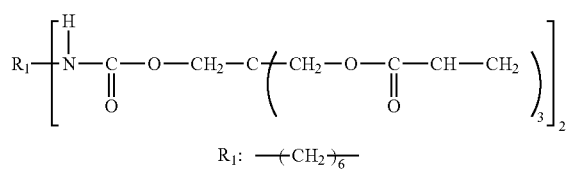

(9)

[Chemical Formula 12]

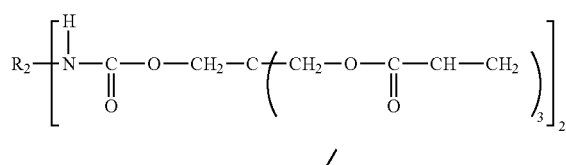

(10)

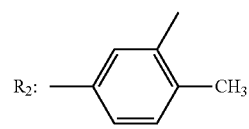

-continued
[Chemical Formula 13]
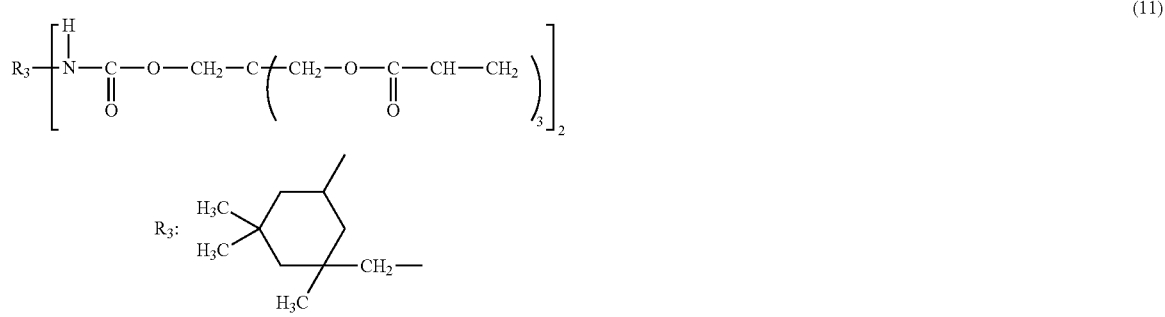
(11)
[Chemical Formula 14]
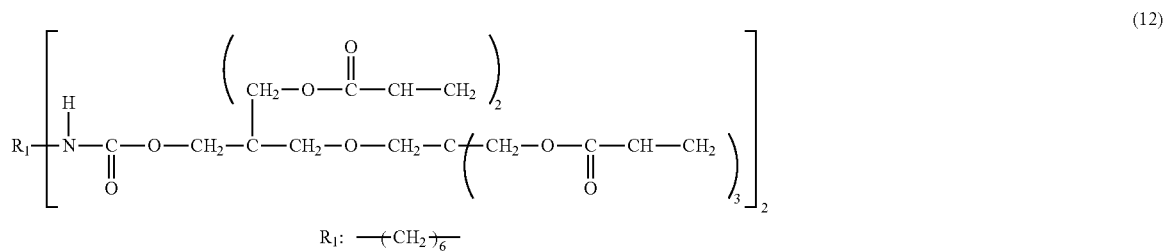
(12)
[Chemical Formula 15]
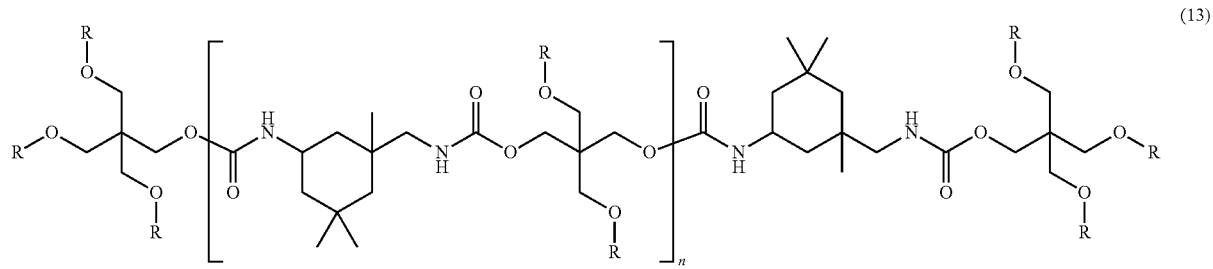
(13)
[Chemical Formula 16]
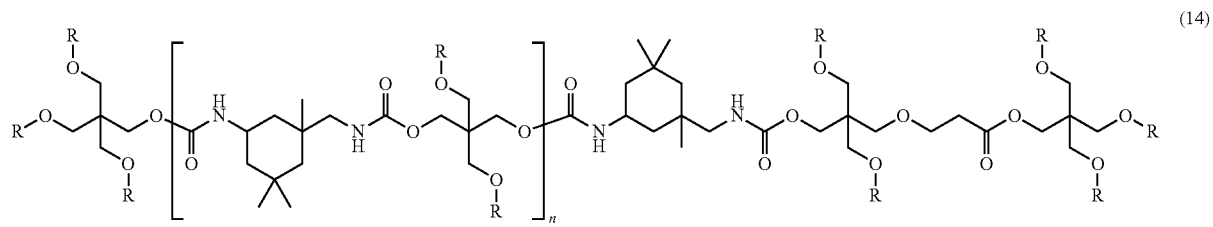
(14)
[Chemical Formula 17]
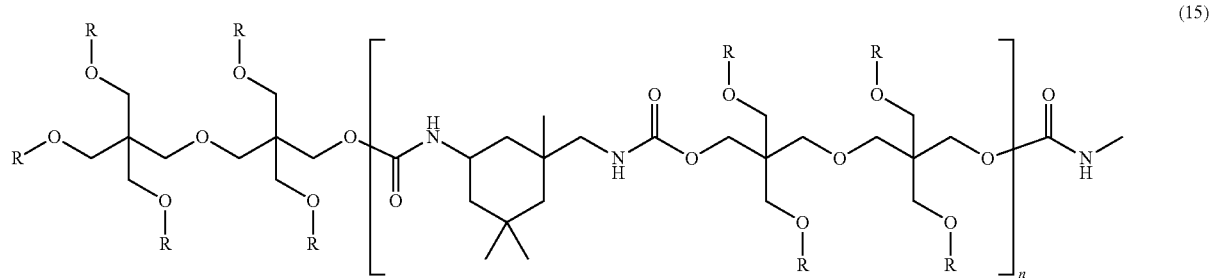
(15)

-continued

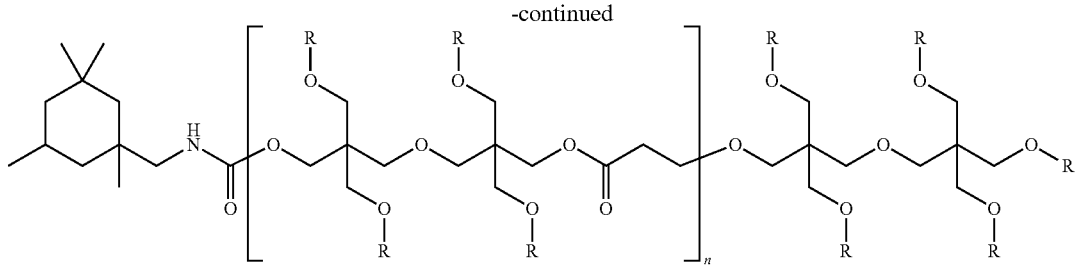

In each of formulae (13) to (15), R's, which may be the same or different, are the one illustrated below. At least one of R's is preferably H.

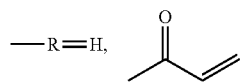

[Chemical Formula 18]

The urethane acrylate having a pentaerythritol skeleton can be synthesized by a known method. For example, an urethane acrylate is generally obtained by causing hydroxyl groups of a polyol compound, a polyisocyanate compound or some other compound, to react with a hydroxyl-group-containing (meth)acrylate by a known method; therefore, in the same way, the urethane acrylate having a pentaerythritol skeleton can be produced by, for example, any one of the following production methods 1 to 4:

(Production method 1): a method of charging a polyol compound, a polyisocyanate compound and a pentaerythritol-skeleton-containing (meth)acrylate at a time, and causing the components to react with each other, (Production method 2): a method of causing a polyol compound and a polyisocyanate compound to react with each other, and next causing the resultant to react with a pentaerythritol-skeleton-containing (meth)acrylate, (Production method 3): a method of causing a polyisocyanate compound and a pentaerythritol-skeleton-containing (meth)acrylate to react with each other, and next causing the resultant to react with a polyol compound, and (Production method 4): a method of causing a polyisocyanate compound and a pentaerythritol-skeleton-containing (meth)acrylate to react with each other, next causing the resultant to react with a polyol compound, and finally causing the resultant to react with the pentaerythritol-skeleton-containing (meth)acrylate.

In these reactions, a catalyst may be used. For example, a tin based catalyst such as dibutyltin laurate, or a tertiary amine catalyst is used.

Examples of the pentaerythritol-skeleton-containing (meth)acrylate used in the production methods 1 to 4 include hydroxyl-group-containing (meth)acrylates such as pentaerythritol diacrylate, pentaerythritol triacrylate, dipentaerythritol pentaacrylate, and dipentaerythritol tetraacrylate, and the like.

Examples of the polyisocyanate compound used in the production methods 1 to 4 include 2,4-tolylenediisocyanate, 2,6-tolylenediisocyanate, 1,3-xylilenediisocyanate, 1,4-xylilenediisocyanate, 1,5-naphthalenediisocyanate, m-phenylenediisocyanate, p-phenylenediisocyanate, 3,3'-dimethyl-4,4'-diphenylmethanediisocyanate, 4,4'-diphenylmethanediisocyanate, 3,3'-diphenylmethanediisocyanate, 4,4'-biphenylenediisocyanate, 1,6-hexanediisocyanate, isophoronediisocyanate (3-isocyanatomethyl-3,5,5-trimethylcyclohexylisocyanate), methylenebis(4-cyclohexylisocyanate), 2,2,4-trimethylhexamethylenediisocyanate, 1,4-hexamethylenediisocyanate, bis(2-isocyanatoethyl) fumarate, 6-isopropyl-1,3-phenyldiisocyanate, 4-diphenylpropanediisocyanate, lysinediisocyanate, and the like.

As the urethane acrylate having a pentaerythritol skeleton, a commercially available one containing an urethane acrylate having a pentaerythritol skeleton may be used. Examples thereof include UA-306H, UA-306I, UA-306T, and UA-510 (each manufactured by Kyoeisha Chemical Co., Ltd.).

The urethane acrylate having both of a pentaerythritol skeleton and an IPDI skeleton can be yielded by using isophoronediisocyanate as the polyisocyanate compound in the production methods 1 to 4.

A commercially available one may be used. Specific examples of the commercially available one containing the urethane acrylate having both of a pentaerythritol skeleton and an IPDI skeleton include the following:

AY42-151 (containing $SiO_2$ fine particles as a filler, and manufactured by Dow Corning Toray Co., Ltd.), UVHC 3000 (containing no filler and manufactured by Momentive Performance Materials Japan LLC, UVHC 7000 (containing no filler and manufactured by Momentive Performance Materials Japan LLC), and the like.

(c) Phosphoric Ester Having One or More Polymerizable Groups in the Molecule Thereof:

The material for forming the primer layer may be a phosphoric ester having one or more polymerizable groups in the molecule thereof, and is preferably a phosphoric monoester or phosphoric diester having one or more polymerizable groups in the molecule thereof. About the phosphoric ester having one or more polymerizable groups in the molecule thereof, its ester moiety usually has the polymerizable group(s). Preferably, one ester moiety has one polymerizable group. The number of the polymerizable group(s) in the molecule is preferably one or two. The phosphoric ester preferably has a structure of a (poly)alkylene oxide such as (poly)ethylene oxide or poly(propylene) oxide in the molecule thereof.

The polymerizable group is preferably a group polymerized by heat, irradiation with an energy ray, or some other. The group is, for example, one having an ethylenically unsaturated double bond, such as a (meth)acryloyloxy group.

More specifically, the material for forming the primer layer is preferably a phosphoric monoester or phosphoric diester having a (meth)acryloyloxy group in the molecule thereof.

An example of the phosphoric monoester or phosphoric diester having a (meth)acryloyloxy group in the molecule thereof is a compound represented by the following formula (16) or (17):

[Chemical Formula 19] (16)

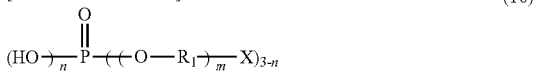

wherein R1 each independently represents a linear or branched alkylene group having 1 to 4 carbon atoms, no is an integer of 1 or more, n is 1 or 2, X each independently is selected from the following:

[Chemical Formula 23]

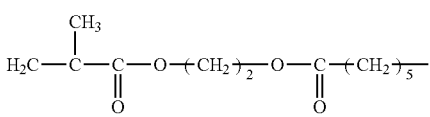
(c)

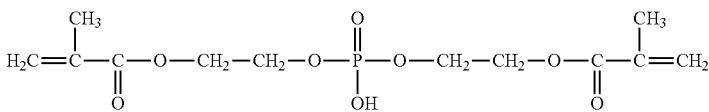
(d)

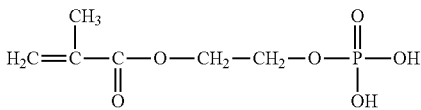
(e)

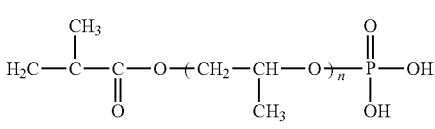
(f)

n = 4-5

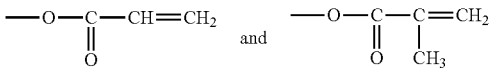
(g)

n = 5-6

[Chemical Formula 20]

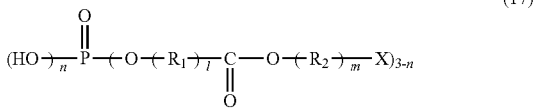

m is preferably from 1 to 10, more preferably from 1 to 6, or

[Chemical Formula 21] (17)

wherein R1 and R2, each independently represents a linear or branched alkylene group having 1 to 4 carbon atoms, l and m are each independently an integer of 1 or more, and n is 1 or 2, and X is each independently selected from the following:

[Chemical Formula 22]

l is preferably from 1 to 10, more preferably from 1 to 5, and in is preferably from 1 to 5, more preferably from 1 to 2.

Examples of the phosphoric ester having one or more polymerizable groups in the molecule thereof include PM-21 (the following formula c) manufactured by Nippon Kayaku Co., Ltd.; P-2M (the following formula d) and P-1M (the formula e) manufactured by Kyoeisha Chemical Co., Ltd.; PHOSPMER PE (the following formula f) and PHOSPMER PP (the following formula g) manufactured by Uni-Chemical Co., Ltd.; and the like:

These phosphoric monoesters or phosphoric diesters having a (meth)acryloyloxy group may be used in a mixture form, and may each be used in the form of a mixture thereof with a different (meth)acrylate, or with some other.

In the invention, the film thickness of the primer layer is preferably 500 nm or less, more preferably from 1 to 500 nm. The thickness is preferably from 10 to 500 nm, more preferably from 10 to 200 nm, even more preferably from 40 to 100 nm. When the film thickness is 1 nm or more, the film can exhibit a sufficient bonding strength. When the film thickness is 500 nm or less, the tackiness of the primer layer is not too strong so that the following inconvenience tends not to be easily caused: after the primer layer is painted and the resultant is wound around a roll, the primer layer is transferred onto the rear surface of the transparent resin substrate film; or when a light control film is produced, the positioning of the transparent resin substrate film on the side to be laminated becomes difficult.

The film thickness of the primer layer can be measured by Reflectance spectroscopy of ultraviolet rays or visible rays, X-ray reflectivity analysis, ellipsometry or the like.

<Light Control Layer>

The light control layer in the invention is composed of a light control material containing a resin matrix and a light control suspension dispersed in the resin matrix. The resin matrix is composed of a polymeric medium, and the light control suspension is the one wherein light control particles are dispersed in a dispersing medium in the state that the particles can flow. As the polymeric medium and the dispersing medium (dispersing medium in the light control suspension), use is made of a polymeric medium and a dispersing medium that make it possible that the polymeric medium and a cured product therefrom can undergo phase-separation from the dispersing medium at least when these materials have been formed into a film. It is preferred to use a combination of a polymeric medium and a dispersing medium that are incompatible with each other or are partially compatible with each other.

The polymeric medium used in the invention may be the one which contains (A) a resin having a substituent with an ethylenically unsaturated bond, and (B) a photopolymerization initiator, and which is irradiated with an energy beam such as ultraviolet rays, visible rays, an electron beam, thereby being cured. The resin (A) having an ethylenically unsaturated bond, is preferably a silicone resin, an acrylic resin, a polyester resin or some other from the viewpoint of easiness in the synthesis thereof, the light control performances and endurance thereof, and others. It is preferred from the viewpoint of the light control performances, the endurance and the like, that these resins each has, as a substituent thereof, an alkyl group such as a methyl, ethyl, propyl, isopropyl, butyl, isobutyl, tert-butyl, amyl, isoamyl, hexyl or cyclohexyl group, or an aryl group such as a phenyl or naphthyl group.

Specific examples of the silicone resin include resins described in JP-B-53-36515, JP-B-57-52371, JP-B-58-53656, and JP-B-61-17863.

The silicone resin is synthesized by causing the following compound to undergo dehydrogenation condensation reaction and dealcoholization reaction in the presence of an organic tin catalyst such as 2-ethylhexanetin: a silanol-both-terminated siloxane polymer such as silanol-both-terminated polydimethylsiloxane, silanol-both-terminated polydiphenylsiloxane-dimethylsiloxane copolymer or silanol-both-terminated polydimethyldiphenylsiloxane; a trialkylalkoxysilane such as trimethylethoxysilane; a silane compound containing an ethylenically unsaturated bond, such as (3-acryloxypropyl)methyldimethoxysilane; and some other compound. The form of the silicone resin is preferably of a solvent-free type. In other words, in the case of using a solvent for the synthesis of the silicone resin, it is preferred to remove the solvent after the synthesis reaction.

About the charging formulation of the individual raw materials when the silicone resin is produced, the amount of the silane compound containing an ethylenically unsaturated bond such as (3-acryloxypropyl)methoxysilane, is preferably from 19 to 50% by mass of the total of the siloxane and the silane compound as the starting materials, more preferably from 25 to 40% by mass thereof. If the amount of the silane compound containing an ethylenically unsaturated bond is less than 19% by mass, the ethylenically unsaturated bond concentration in the finally-obtained resin tends to be far lower than the desired concentration. If the concentration is more than 50% by mass, the ethylenically unsaturated bond concentration in the resultant resin tends to be far higher than the desired concentration.

The acrylic resin can be yielded, for example, by copolymerizing a main-chain-forming monomer such as an alkyl (meth)acrylate, an aryl (meth)acrylate, benzyl (meth)acrylate or styrene, with a monomer which contains a functional group for the introduction of an ethylenically unsaturated bond, such as (meth)acrylic acid, hydroxyethyl (meth)acrylate, isocyanatoethyl (meth)acrylate or glycidyl (meth)acrylate, to synthesize a prepolymer once; and next causing the prepolymer to undergo addition reaction with a monomer such as glycidyl (meth)acrylate, isocyanatoethyl (meth) acrylate, hydroxyethyl (meth)acrylate, (meth)acrylic or some other monomer in order to cause the monomer to react with the functional group of the prepolymer.

The polyester resin is not particularly limited, and may be a resin that can easily be produced by a known method.

The weight-average molecular weight of the resin (A) having an ethylenically unsaturated bond is preferably from 20,000 to 100,000, more preferably from 30,000 to 80,000, in terms of polystyrene, by being obtained with gel permeation chromatography.

The ethylenically unsaturated bond concentration in the resin having an ethylenically unsaturated bond is preferably from 0.3 to 0.5 mol/kg. When this concentration is 0.3 mol/kg or more, end regions of the light control film are easily processed so that the transparent electrodes opposite to each other do not short-circuit therebetween. Thus, the light control film does not tend to give a poor electrical reliability. By contrast, when the concentration is 0.5 mol/kg or less, the cured polymeric medium is not easily dissolved into the dispersing medium, which constitutes the droplets of the light control suspension, so as to make it possible to avoid a matter that the dissolved polymeric medium hinders the movement of the light control particles in the droplets so that the light control performance declines.

The ethylenically unsaturated bond concentration in the resin (A) having an ethylenically unsaturated bond is obtained from the ratio between integrated-intensities of hydrogen according to NMR. When the conversion rate of the charged raw material into the resin is known, the concentration is also obtained by calculation.

The photopolymerization initiator (B) used in the polymeric medium may be a compound described in J. Photochem. Sci. Technol., 2, 283 (1977), specific examples thereof including 2,2-dimethoxy-1,2-diphenyethane-1-one, 1-(4-(2-hydroxyethoxy)phenyl)$_2$-hydroxy-2-methyl-1-propane-1-one, bis(2,4,6-trimethylbenzoyl)phenylphosphine oxide, 2-hydroxy-2-methyl-1-phenylpropane-1-one, 1-hydroxycyclohexyl phenyl ketone, and the like.

The use amount of the photopolymerization initiator (B) is preferably from 0.1 to 20 parts by mass, more preferably from 0.2 to 10 parts by mass for 100 parts by mass of the resin (A).

Besides the resin (A) having a substituent with an ethylenical unsaturated bond, the following may be used as a constituting material of the polymeric medium: an organic solvent soluble resin or a thermoplastic resin, such as polyacrylic acid or polymethacrylic acid having a weight-average molecular weight of 1,000 to 100,000, in terms of polystyrene, by being measured with gel permeation chromatography.

An additive, such as a coloration inhibitor such as dibutyltin dilaurate, may be added into the polymeric medium if necessary. The polymeric medium may contain a solvent. The solvent may be tetrahydrofuran, toluene, heptane, cyclohexane, ethyl acetate, ethanol, methanol, isoamyl acetate, hexyl acetate, or the like.

It is preferred to use, as the dispersing medium in the light control suspension, a liquid copolymer which: fulfills a function of a dispersing medium in the light control suspension; adheres onto the light control particles selectively to cover the particles so that at the time of phase separation thereof from the polymeric medium, the dispersing medium acts to cause the particles to be shifted to the phase-separated droplet phase; has neither electroconductivity nor affinity with the polymeric medium.

The liquid copolymer is preferably, for example, a (meth) acrylic acid ester oligomer having fluoro groups and/or hydroxyl groups, more preferably a (meth)acrylic acid ester oligomer having fluoro groups and hydroxyl groups. When such a liquid copolymer is used, the monomer units of either the fluoro groups or the hydroxyl groups face toward the light control particles. The monomer units of the other function to cause the light control suspension to be stably kept as droplets in the polymeric medium. Therefore, the light control particles are extremely homogeneously dispersed in the light control suspension, and at the time of the phase separation the light control particles are introduced into the phase-separated droplets.

The (meth)acrylic acid ester oligomer having fluoro groups and/or hydroxyl groups may be an oligomer obtained by using a fluoro-group-containing monomer and/or a hydroxyl-group-containing monomer, and by carrying out copolymerization with the monomer(s). Specific examples thereof include 2,2,2-trifluoroethyl methacrylate/butyl acrylate/2-hydroxyethyl acrylate copolymer, 3,5,5-trimethylhexylacrylate/2-hydroxypropyl acrylate/fumaric acid copolymer, butyl acrylate/2-hydroxyethyl acrylate copolymer, 2,2,3,3-tetrafluoropropyl acrylate/butyl acrylate/2-hydroxyethyl acrylate copolymer, 1H,1H,5H-octafluoropentyl acrylate/butyl acrylate/2-hydroxyethyl acrylate copolymer, 1H,1H,2H,2H-heptadecafluorodecyl acrylate/butyl acrylate/2-hydroxyethyl acrylate copolymer, 2,2,2-trifluoroethyl methacrylate/butyl acrylate/2-hydroxyethyl acrylate copolymer, 2,2,3,3-tetrafluoropropyl methacrylate/butyl acrylate/2-hydroxyethyl acrylate copolymer, 1H,1H,5H-octafluoropentyl methacrylate/butyl acrylate/2-hydroxyethyl acrylate copolymer, 1H,1H,2H,2H-heptadecafluorodecyl methacrylate/butyl acrylate/2-hydroxyethyl acrylate copolymer, and the like. The (meth)acrylic acid ester oligomers each preferably has both of fluoro groups and hydroxyl groups.

The weight-average molecular weight of these (meth)acrylic acid ester oligomers is preferably from 1,000 to 20,000, more preferably from 2,000 to 10,000, in terms of standard polystyrene, by being measured with gel permeation chromatography.

The use amount of the fluoro-group-containing monomer that is one of the starting materials of each of these (meth)acrylic acid ester oligomers is preferably from 6 to 12% by mole of the total of monomers that are the starting materials, more effectively from 7 to 8% by mole thereof. If the use amount of the fluoro-group-containing monomer is more than 12% by mole, the refractive index tends to become large so that the light transmittance falls. The use amount of the hydroxyl-group-containing monomer that is one of the starting materials of each of these (meth)acrylic acid ester oligomers is preferably from 0.5 to 22.0% by mole, more effectively from 1 to 8% by mole. If the use amount of the hydroxyl-group-containing monomer is more than 22.0% by mole, the refractive index tends to become large so that the light transmittance falls.

The light control suspension used in the invention is a substance wherein light control particles are dispersed in the dispersing medium in the state that the particles can flow. As the light control particles, for example, the following are preferably used: needle-form small crystals of a polyiodide produced by causing iodine and a iodide to react with one material selected from the group consisting of pyrazine-2,3-dicarboxylic acid dihydrate, pyrazine-2,5-dicarboxylic acid dihydrate, and pyridine-2,5-dicarboxylic acid monohydrate, which are each a precursor of the light control particles, in the presence of a polymeric dispersing agent that is not affinitive with the polymeric medium or the resin component in the polymeric medium, that is, the resin (A) having a substituent with an ethylenically unsaturated bond or the like, and that is further capable of making the dispersibility of the light control particles high. Usable examples of the polymeric medium are nitrocellulose and the like. The iodide may be calcium iodide or the like. Examples of the thus-obtained polyiodide include compounds represented by the following general formulae:

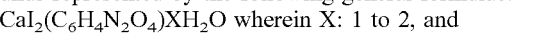  $CaI_2(C_6H_4N_2O_4)XH_2O$ wherein X: 1 to 2, and
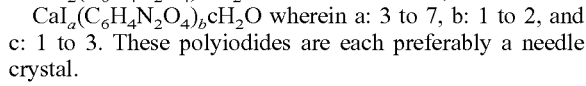  $CaI_a(C_6H_4N_2O_4)_b cH_2O$ wherein a: 3 to 7, b: 1 to 2, and c: 1 to 3. These polyiodides are each preferably a needle crystal.

As the light control particles used for light control suspension for the light control film, for example, light control particles disclosed in the following may be used: U.S. Pat. No. 2,041,138 (E. H. Land); U.S. Pat. No. 2,306,108 (Land et al.); U.S. Pat. No. 2,375,963 (Thomas); U.S. Pat. No. 4,270,841 (R. L. Saxe); and GB Patent No. 433,455. The polyiodide crystals known by these patents are each produced by selecting one from pyrazine carboxylic acids and pyridine carboxylic acids, and causing the selected acid to react with iodide, chlorine or bromine so as to be turned to a polyhalide such as polyiodide, polychloride or polybromide. The polyhalide is a complex compound obtained by causing a halogen atom to reacts with an inorganic or organic material. Details of the production process thereof are disclosed in, for example, U.S. Pat. No. 4,422,963 given to Saxe.

In the step of synthesizing the light control particles, in order to make the light control particles into an even size and to improve the dispersibility of the light control particles in the specified dispersing medium, it is preferred to use, as the polymeric dispersing agent, a polymeric material such as nitrocellulose, as disclosed by Saxe. However, when nitrocellulose is used, crystals covered with nitrocellulose are obtained. According to the use of such crystals as the light control particles, the light control particles may not float in the droplets separated at the time of the phase separation, so as to remain in the resin matrix. In order to prevent this, it is preferred to use a silicone resin having a substituent with an ethylenically unsaturated bond as the resin (A) having a substituent with an ethylenically unsaturated bond, in the polymeric medium. The use of the silicone resin makes it possible that the light control particles are easily dispersed and floated in fine droplets formed by the phase separation in the production of the film. As a result, the film can obtain a better variability (reversibility).

Besides the light control particles, use may be made of, for example, an inorganic fiber such as carbon fiber, or a phthalocyanine compound such as τ type metal-free phthalocyanine or a metal phthalocyanine, and the like. Examples of the central metal in the phthalocyanine compound include copper, nickel, iron, cobalt, chromium, titanium, beryllium, molybdenum, tungsten, aluminum, chromium, and the like.

In the invention, the size of the light control particles is preferably 1 μm or less, more preferably from 0.1 to 1 μm, even more preferably from 0.1 to 0.5 μm. When the size of the light control particles is less than 1 μm, light is not easily scattered thereon and further, at the time of applying an electric field to the film of the invention, it is possible to avoid a problem that the transparency may be declined, which is caused by that an orientation movement thereof is decreased in the light control suspension. The size of the light control particles is defined as the volume-average particle diameter measured with a submicron particle analyzer (for example, trade name: N4MD, manufactured by Beckman Coulter, Inc.) according to photon correlation spectrometry.

The light control suspension used in the invention is preferably composed of 1 to 70% by mass of the light control particles and 30 to 99% by mass of the dispersing medium, and is more preferably composed of 4 to 50% by mass of the light control particles and 50 to 96% by mass of the dispersing medium.

In the invention, the refractive index of the polymeric medium is preferably close to that of the dispersing medium. Specifically, the difference in refractive index between the polymeric medium and the dispersing medium in the invention is preferably 0.005 or less, more preferably 0.003 or less. The light control material contains the light control suspension in an amount usually from 1 to 100 parts by mass, preferably from 6 to 70 parts by mass, more preferably from 6 to 60 parts by mass relative to 100 parts by mass of the polymeric medium.

<Transparent Electroconductive Resin Substrates>

In general, the transparent electroconductive resin substrates used when the light control material according to the invention is used to produce a light control film may each be a transparent electroconductive resin substrate wherein: a transparent resin substrate is coated with a transparent electroconductive film (an ITO, $SnO_2$, $In_2O_3$ or organic electroconductive film, or some other film), the total transmittance of the transparent resin substrate and the transparent electroconductive film is 80% or more, and a surface resistance value within the range of 3 to 3000Ω is exhibited. The light transmittance of the transparent electroconductive resin substrate may be measured according to the method for measuring total light ray transmittance in JIS K7150. The transparent resin substrate may be, for example, a polymeric film or the like.

The polymeric film is, for example, a film of a polyester such as polyethylene terephthalate, a film of a polyolefin such as polypropylene, a polyvinyl chloride film, an acrylic resin film, a polyethersulfone film, a polyarylate film, a polycarbonate film, or some other resin film. A polyethylene terephthalate film is preferred since the film is excellent in transparency, formability, bondability, workability, and others.

The thickness of the transparent electroconductive film with which the transparent resin substrate is coated is preferably within the range of 10 to 5,000 nm. The thickness of the transparent resin substrate is not particularly limited. When the substrate is, for example, a polymeric film, the thickness is preferably within the range of 10 to 200 µm. In order to prevent a short-circuit phenomenon generated by a matter that the gap between the transparent resin substrates is narrow so that the incorporation of a contaminant and others are generated, it is allowable to use transparent electroconductive resin substrates in each of which a transparent insulating layer having a thickness within the range of several nanometers to about 1 µm is formed on a transparent electroconductive film. When the light control film of the invention is used in a reflective-type light control window (in, for example, a rear viewing mirror for cars, or the like), a thin film in a electroconductive metal, such as aluminum, gold or silver, which is a reflecting body, may be used directly as an electrode.

<Light Control Film>

The light control film of the invention can be formed, using a light control material, and the light control material is composed of a resin matrix made of a polymeric medium, and a light control suspension dispersed in the resin matrix, and forms a light control layer. The light control layer is sandwiched between two transparent electroconductive resin substrates each having a primer layer for improving the adhesiveness of the substrate onto the light control layer, or is sandwiched between two transparent electroconductive resin substrates one of which has a primer layer and the other of which does not have any primer layer.

In order to yield the light control film, a liquid light control suspension is first mixed with a polymeric medium homogeneously to yield a light control material made of a mixed liquid wherein the light control suspension is dispersed, in the state of droplets, in the polymeric medium.

Specifically, this process is as follows: A liquid wherein light control particles are dispersed in a solvent is mixed with a dispersing medium for light control suspension, and then the solvent is distilled off by means of a rotary evaporator or the like to prepare a light control suspension.

Next, the light control suspension and a polymeric medium are mixed with each other to prepare a mixed liquid (light control material) wherein the light control suspension is dispersed, in the state of droplets, in the polymeric medium.

This light control material is painted into a constant thickness onto a transparent electroconductive resin substrate having a primer layer, and optionally the solvent contained in the light control material is dried and removed. A high-pressure mercury lamp or the like is then used to radiate ultraviolet rays thereto, thereby curing the polymeric medium. As a result, a light control layer is formed wherein the light control suspension is dispersed, in the form of droplets, in a resin matrix made of the cured polymeric medium. By changing the blend ratio between the polymeric medium and the light control suspension variously, the light transmittance of the light control layer can be adjusted. Another transparent electroconductive resin substrate having a primer layer is caused to adhere closely to the thus formed light control layer, thereby a light control film is yielded. Alternatively, it is allowable to paint this light control material into a constant thickness onto a transparent electroconductive resin substrate having a primer layer, optionally dry and remove the solvent contained in the light control material, laminate another transparent electroconductive resin substrate having a primer layer thereon, and then irradiate the lamination with ultraviolet rays to cure the polymer medium. Only one of the transparent electroconductive resin substrates may be a transparent electroconductive resin substrate having a primer layer. It is also allowable to form light control layers onto both of two transparent electroconductive resin substrates, respectively, and then laminate the substrates onto each other to cause the light control layers to adhere closely to each other. The thickness of the light control layers is preferably within the range of 5 to 1,000 µm, more preferably within the range of 20 to 100 µm.

The size (average droplet diameter) of the droplets of the light control suspension dispersed in the resin matrix is usually from 0.5 to 100 µm, preferably from 0.5 to 20 µm, more preferably from 1 to 5 µm. The size of the droplets is decided in accordance with the concentrations of the individual components that constitute the light control suspension, the viscosities of the light control suspension and the polymeric medium, the compatibility of the dispersing medium in the light control suspension with the polymeric medium, and others. The average droplet diameter can be calculated, for example, by using an SEM to take a photograph or some other image of the light control film along the direction toward one of its surfaces, measuring the diameters of arbitrarily-selected ones out of droplets therein, and then getting the average value thereof. The diameter can also be calculated by taking a viewing field image of the light control film through an optical microscope, as digital data, into a computer, and then applying an image processing integration software thereto.

The primer treatment (the formation of the primer layer) onto (one or each of) the transparent electroconductive resin substrates in the invention can be conducted, for example, by applying the material for forming the primer layer onto the transparent resin substrate, using a bar coater method, a Mayer bar coater method, an applicator method, a doctor blade method, a roll coater method, a die coater method, a comma coater method, a gravure coater method, a microgravure coater method, a roll brush method, a spray coating method, an air knife coating method, an impregnation method, a curtain coating method, and others alone or in combination. At the time of the applying, it is allowable to dilute the material for forming the primer layer optionally with an appropriate solvent, and then use the solution of the material for forming the primer layer.

When the solvent is used, it is necessary to dry the resultant after applying the solution onto the transparent electroconductive resin substrate. As the need arises, the painted film, which is to be the primer layer, may be formed onto only a single surface (on the transparent electroconductive film side) of the transparent electroconductive resin substrate, or onto both surfaces of the substrate by an immersing method or dip coating method.

The solvent used to form the primer layer may be any solvent that is a solvent wherein the material for forming the primer layer is dissolved or dispersed, and that can be removed by drying or the like after the formation of the primer layer. Examples thereof include isopropyl alcohol, ethanol, methanol, 1-methoxy-2-propanol, 2-methoxyethanol, cyclohexanone, methyl isobutyl ketone, anisole, methyl ethyl ketone, acetone, tetrahydrofuran, toluene, heptane, cyclohexane, ethyl acetate, propylene glycol monomethyl ether acetate, diethyl diglycol, dimethyl diglycol, isoamyl acetate, hexyl acetate, and the like. A mixed solvent thereof may be used.

For the applying of the light control material, which is to be the light control layer, use is made of a known applying means, such as a bar coater, an applicator, a doctor blade, a roll coater, a die coater, or a comma coater. The light control material is applied onto the primer layer laid on each of the transparent electroconductive resin substrates. Alternatively, in the case of using transparent electroconductive resin substrates one of which has no primer layer, the light control material may be applied directly onto the transparent electroconductive resin substrate. At the time of the applying, the light control material may be diluted with an appropriate solvent as the need arises. When the solvent is used, it is necessary that after the diluted light control material is applied onto one or each of the transparent electroconductive resin substrates, the substrate is dried.

The solvent used for applying the light control material may be tetrahydrofuran, toluene, heptane, cyclohexane, ethyl acetate, ethanol, methanol, isoamyl acetate, hexyl acetate, or the like. In order to form a light control layer wherein the liquid light control suspension is dispersed, in the form of fine droplets, in the solid resin matrix, use may be made of a method of using a homogenizer, an ultrasonic homogenizer, or the like to mix components of the light control material with each other to disperse the light control suspension into the polymeric medium, a phase separation method based on the polymerization of the resin component in the polymeric medium, a phase separation method based on the volatilization of the solvent contained in the light control material, a phase separation method depending on temperature, or some other method.

According to the above-mentioned process, a light control film can be provided wherein the light transmittance can be adjusted at will by the formation of an electric field. Also when no electric field is formed, this light control film is kept in a vividly colored state, wherein no light is scattered. When an electric field is formed, the film is converted into a transparent state. This capability exhibits a property that 200000 or more reversible repetitions can be attained. In order to increase the light transmittance in the transparent state, and increase the vividness in the colored state, it is preferred to make the refractive index of the liquid light control suspension equal to that of the resin matrix. As for the power source used to operate the light control film, an alternating current may be used, and the voltage thereof may be from 10 to 100 volts (effective value), and the frequency thereof may be in the range of 30 Hz to 500 kHz. In the light control film of the invention, the response time to the electric field may be set into the range of 1 to 50 seconds when the film is caused to give no color, and that may be set into the range of 1 to 100 seconds when the film is caused to give a color. As for the endurance against ultraviolet rays, results of an ultraviolet radiating test using ultraviolet rays of 750 W power and others demonstrate that a stable variability is exhibited even after the lapse of 250 hours. Even when the film is allowed to stand still at −50 to 90° C. over a long period, the initial variability can be maintained.

When use is made of a method based on a water-used emulsion in the production of a light control film wherein a liquid crystal is used in the prior art, the liquid crystal reacts with water so that the light control property is lost in many cases. Thus, there is caused a problem that films having similar properties are not easily produced. In the invention, use is made of not any liquid crystals, but a liquid-form light control suspension in which light control particles are dispersed, thus, even when no electric field is applied, the light control film does not cause light to be scattered and the film is in such a colored state that the vividness is excellent and no limitation is imposed onto the viewing angle, unlike the liquid-crystal-used light control films. By adjusting the content by percentage of the light control particles, adjusting the droplet form or the film thickness, or adjusting the electric field intensity, the light variation degree can be adjusted at will. In the light control film of the invention, no liquid crystal is used; therefore, the following are also overcome: a change in the color tone and a fall in the variability power, which are based on the irradiation with ultraviolet rays; and a response time lag following a voltage drop generated between the periphery of the transparent resin electroconductive substrates and the center thereof, the lag being peculiar to large-sized products.

When no electric field is applied to the light control film according to the invention, the film turns in a vividly colored state because of light absorption of the light control particles and dichroic effect on the basis of the Brownian movement of the light control particles in the light control suspension. However, when an electric field is applied thereto, the light control particles in the droplets or associated droplets are arranged in parallel to the electric field, so that the film is converted into a transparent state. Since the film of the invention is in a film state, the film solves the problems of light control glass in the prior art, wherein a liquid light control suspension is used as it is, that is, the following problems: the liquid suspension is not easily injected between two transparent electroconductive resin substrates; a difference in hydraulic pressure between the upper and lower regions of the product easily causes an expansion phenomenon of the lower region; and in accordance with the external environment, for example, the pressure of wind or the like, the gap between the substrates is changed so that the color phase is locally changed; or a sealing member between the transparent electroconductive resin substrates is broken so that the light control material leaks.

In a case of a light control window according to the prior art wherein a liquid crystal is used, the liquid crystal is easily deteriorated by ultraviolet rays and further the range of the use temperature thereof is also narrow because of thermal properties of the nematic liquid crystal. Furthermore, as for optical properties thereof also, the following problems are caused: when no electric field is applied thereto, the window is turned in a milk-white semi-transparent state by light scattering; and even when an electric field is applied thereto, the window is not completely turned vivid so that the opacified state remains. Accordingly, such a light control window cannot attain a display function based on the blocking and transmission of light, which are used as an action principle in existing liquid crystal display elements. However, the use of the light control film of the invention makes it possible to solve such problems.

In the light control film of the invention, the adhesiveness between the light control layer and the transparent electroconductive resin substrates is strong. Thus, the film is an excellent light control film which does not cause a problem that the light control layer is peeled from the transparent electroconductive resin substrates in the production steps, a working step after the production of the film, or some other step.

The light control film of the invention can be suitably used for application for, for example, an indoor or outdoor partition; a window glass plate or skylight for building; various flat display elements used in the electronic industry and for imaging instruments; alternate products for various gauge boards and existing liquid crystal display elements; a light shutter; various indoor and outdoor advertisement- and guide-indicating boards; window glass plates for an aircraft, a railway vehicle and a ship; window glass plates, a back mirror and a sun roof for a car; glasses; sunglasses; a sun visor; and other articles.

The using manner of the light control film of the invention may be a direct use of the film. In accordance with the application, for example, the light control film may be used in the state that the film is sandwiched between two substrates, or in the state that the film is adhered onto a single surface of a substrate. The substrate may be, for example, a glass plate, a polymeric film equivalent to the above-mentioned transparent resin substrates, or the like.

The structure and the operation of the light control film according to the invention will be described below in more detail with reference to the drawings.

FIG. 1 is a schematic view of the structure of a light control film of an embodiment of the invention. A light control layer 1 is sandwiched between two transparent electroconductive resin substrates 4, which are composed of two transparent resin substrates 5b each of which is coated with a transparent electroconductive film 5a. A primer layer 6 is arranged between the light control layer 1 and each of the transparent electroconductive resin substrates 4. By switching a switch 8, a power source 7 is connected or disconnected to the two transparent electroconductive films 5. The light control layer 1 is composed of a film-form resin matrix 2 obtained by curing the resin (A) having a substituent with an ethylenically unsaturated bond, with ultraviolet rays, and a liquid-form light control suspension dispersed, in the form of droplets 3, in the resin matrix 2.

Figure 2:
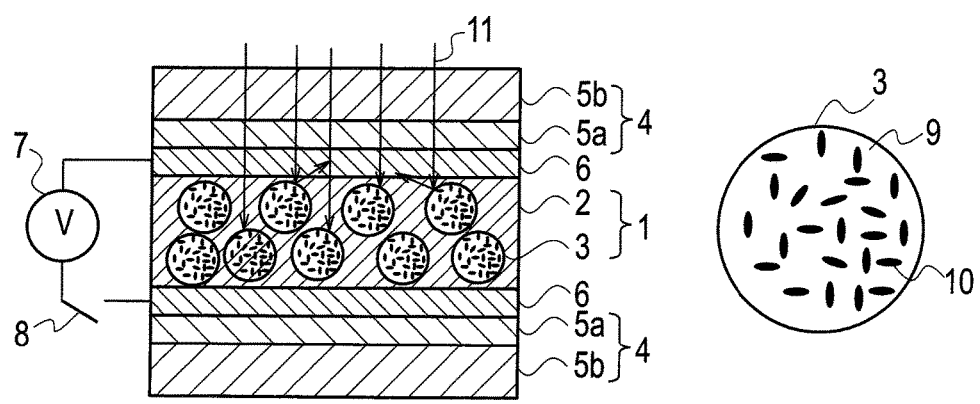
FIG. 2 are each a schematic view referred to in order to describe the action of the light control film in FIG. 1 when no electric field is applied thereto.
Figure 3:
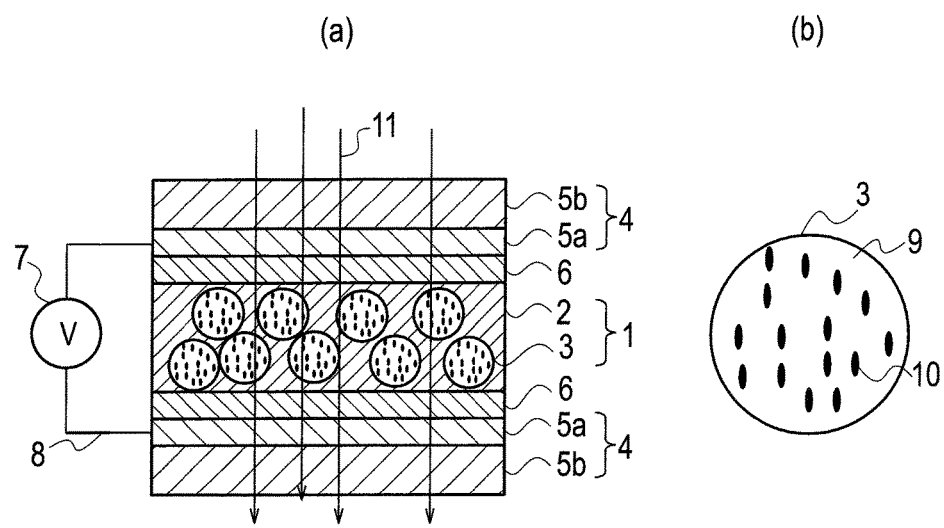
FIG. 3 are each a schematic view referred to in order to describe the action of the light control film in FIG. 1 when an electric field is applied thereto.

FIG. 2 are each a schematic view referred to in order to describe the operation of the light control film illustrated in FIG. 1, and each illustrates a case where the switch 8 is turned off to apply no electric field. In this case, incident rays 11 are absorbed, scattered or reflected in or on light control particles 10, which are dispersed in a dispersing medium 9 constituting the droplets 3 of the liquid-form light control suspension, by the Brownian movement of the light control particles 10. Thus, the rays 11 cannot be transmitted. As illustrated in FIG. 3, however, when the switch 8 is connected, so as to apply an electric field, the light control particles 10 are arranged in parallel to an electric field formed by the applied electric field so that the incident rays 11 come to pass between the arranged light control particles 10. In this way, a light transmitting function which causes neither scattering nor a fall in the transparency is produced.

EXAMPLES

The invention will be more specifically described by way of examples of the invention and the comparative examples hereinafter. However, the invention is not limited by these examples.

Production Example of Light Control Particles

In order to produce light control particles, in a 500 mL four-necked flask equipped with a stirrer and a condenser tube, 4.5 g of iodide (JIS extra pure reagent, manufactured by Wako Pure Chemical Industries, Ltd.) was dissolved in a solution composed of 87.54 g of a 15% by mass solution of nitrocellulose (trade name: 1/4 LIG, manufactured by Bergerac NC Co.), diluted with isoamyl acetate (extra pure reagent, manufactured by Wako Pure Chemical Industries, Ltd.), 44.96 g of isoamyl acetate, 4.5 g of dehydrated $CaI_2$ (for chemistry, manufactured by Wako Pure Chemical Industries, Ltd.), 2.0 g of anhydrous ethanol (for organic synthesis, manufactured by Wako Pure Chemical Industries, Ltd.), and 0.6 g of purified water (purified water, manufactured by Wako Pure Chemical Industries, Ltd.). Thereto was then added 3 g of pyrazine-2,5-dicarboxylic acid dihydrate (manufactured by PolyCarbon Industries), which was a base-forming material of the light control particles.

The resultant was stirred at 45° C. for 3 hours to terminate the reaction, and then dispersed by means of an ultrasonic disperser for 2 hours. At this time, the color tone of the mixed liquid changed from brown to navy blue. Next, in order to take out light control particles having a certain size from the reaction solution, a centrifugal separator was used to separate other light control particles. The reaction solution was centrifuged at a rate of 750 G for 10 minutes to remove the precipitation. Furthermore, the solution was centrifuged at a rate of 7390 G for 2 hours to remove the floated materials, and the precipitation particles were collected. The precipitation particles were in the form of needle crystals having an average particle diameter of 0.36 μm, the diameter being measured by means of a submicron particle analyzer (product name: N4MD, manufactured by Beckman Coulter, Inc.). The precipitation particles were referred to as the light control particles.

Production Example of a Light Control Suspension

The light control particles yielded in the item (Production example of light control particles), the amount of which was 45.5 g, were added to 50 g of a copolymer of butyl acrylate (Wako extra pure reagent, manufactured by Wako Pure Chemical Industries, Ltd.)/2,2,2-trifluoroethyl methacrylate (for industry, manufactured by Kyoeisha Chemical Co., Ltd.)/2-hydroxyethyl acrylate (Wako first class reagent, manufactured by Wako Pure Chemical Industries, Ltd.) (ratio by mole between the monomers: 18/1.5/0.5, weight-average molecular weight: 2,000, refractive index: 1.4719), as a dispersing medium of the light control particles, and then a stirrer was used to mix the components with each other for 30 minutes. Next, a rotary evaporator was used to remove isoamyl acetate at 80° C. in a vacuum having a reduced pressure of 133 Pa for 3 hours to produce a stable liquid-form light control suspension wherein there was not caused a phenomenon that the light control particles precipitated and aggregated.

Production Example of an Energy-Beam-Curable Silicone Resin

Into a four-necked flask equipped with a Dean-Stark trap, a condenser tube, a stirrer and a heating device, 17.8 g of silanol-both-terminated polydimethylsiloxane (reagent, manufactured by Chisso Corp.), 62.2 g of silanol-both-terminated polydimethyldiphenylsiloxane (reagent, manufactured by Chisso Corp.), 20 g of (3-acryloxypropyl)methyldimethoxyislane (reagent, manufactured by Chisso Corp.), and 0.1 g of 2-ethylhexanetin (manufactured by Wako Pure Chemical Industries, Ltd.) were charged. In heptane, the solution was refluxed at 100° C. for 3 hours to conduct a reaction. Next, thereto was added 25 g of trimethylethoxysilane (reagent, manufactured by Chisso Corp.), and the resultant was refluxed for 2 hours to cause a dealcoholization reaction, and then a rotary evaporator was used to remove heptane in a vacuum having a reduced pressure of 100 Pa at 80° C. for 4 hours to yield an energy-beam-curable silicone resin having a weight-average molecular weight of 35000, and a refractive index of 1.4745. From the hydrogen integrated-intensity ratio according to NMR, the concentration of ethylenically unsaturated bonds in this resin was 0.31 mol/kg. The ethylenically unsaturated bond concentration was measured by a method described below.
[Method for Measuring the Ethylenically Unsaturated Bond Concentration]

The ethylenically unsaturated bond concentration (mol/kg) was calculated from the hydrogen integrated-intensity ratio according to NMR (using an integrated value of hydrogen in the ethylenically unsaturated bond near 6 ppm, an integrated value of hydrogen in phenyl groups near 7.5 ppm, and an integrated value of hydrogen in methyl groups near 0.1 ppm). $CDCl_3$ was used as the solvent for the measurement. In the resin produced as described above, the ratio by mass calculated from the hydrogen integrated-intensity ratio according to NMR was as follows: the methyl groups/the phenyl groups/the ethylenically unsaturated groups was 11/6.4/1. The proportion of the ethylenically unsaturated groups in the whole was 5.4%, and the number of the ethylenically unsaturated groups per molecule was 9.35 from the individual molecular weights. Thus, the mole number per kilogram was calculated to 0.31 mol/kg.

Example 1

The light control suspension yielded in the item (Production example of a light control suspension), the amount of which was 2.5 g, was added to 10 g of the energy-beam-curable silicone resin yielded in the item (Production example of an energy beam curable silicone resin), 0.2 g of bis(2,4,6-trimethylbenzoyl)phenylphosphine oxide (Ciba Specialty Chemicals Inc.) as a photopolymerization initiator, and 0.3 g of dibutyltin dilaurate as a coloration inhibitor, and then the components were mechanically mixed with each other for 1 minute to produce a light control material.

Separately, an applicator method was used under a condition that the gap (used therefor) was 10 μm to apply, as a solution at the time of primer-layer-formation, a dispersion liquid wherein 1,6-hexanediol diacrylate (trade name: LIGHT ACRYLATE 1,6HX-A, manufactured by Kyoeisha Chemical Co., Ltd.), $ZrO_2$, and methyl isobutyl ketone were mixed with each other to give proportions of 1.0% by mass, 5.0% by mass, and 94% by mass, respectively, onto transparent electroconductive film of a transparent electroconductive resin substrate made of a PET film (300R, manufactured by Toyobo Co., Ltd., thickness: 125 μm) which was coated with a transparent electroconductive film (thickness: 300 Å) made of ITO (indium tin oxide) and which had a surface electric resistance value of 200 to 700Ω in such a manner that the dispersion liquid was applied onto the whole surface of the transparent electroconductive film. The workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming a primer layer. At this time, a photopolymerization initiator (1-hydroxycyclohexyl phenyl ketone) was added thereto in an amount of 3% by mass of the product LIGHT ACRYALTE 1,6HX-A.

The average particle diameter of $ZrO_2$ was 20 nm. The content thereof by percentage was 83% by mass of the whole of the materials of the primer layer.

The thickness of the primer layer was 71 nm.

The light control material yielded as above was applied onto the whole surface of the transparent electroconductive resin substrate, on which the primer layer was formed. Next, thereon was laminated the same transparent electroconductive resin substrate, on which a primer layer was formed in the same way, so as to face the primer layer onto the applied layer of the light control material. In thio way, they were caused to adhere closely to each other. A metal halide lamp was used to radiate ultraviolet rays of 3000 mJ/cm$^2$ power onto the laminated transparent electroconductive resin substrates from the polyester film side thereof, so as to produce a light control film of 340 μm thickness wherein a film-form light control layer of 90 μm thickness, in which the light control suspension was dispersed and formed in a resin matrix cured with the ultraviolet rays so as to be in the form of spherical droplets, was sandwiched between the transparent electroconductive resin substrates.

Figure 4:
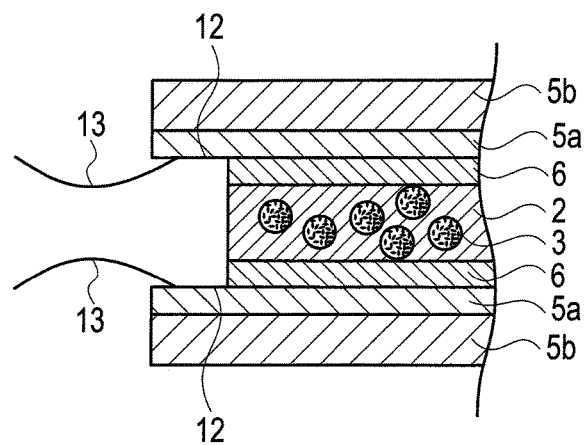
FIG. 4 is a schematic view referred to in order to describe a state of an end region of the light control film. Illustration of light control particles 10 in droplets 3 is omitted.

Next, from an end region of this light control film, a part of the light control layer was removed to make the transparent electroconductive film in the end region naked in order to attain electric conduction for voltage-application (see FIG. 4). The size (average droplet diameter) of the droplets of the light control suspension in the light control film was 3 μm on average. The light transmittance of the light control film was 1.0% when no alternating voltage was applied thereto (the electric-field-unapplied time). When an alternating voltage of 100 V (effective value) having a frequency of 50 Hz was applied thereto, the light transmittance of the light control film was 46%. The ratio between the light transmittance at the electric-field-applied time and that at the electric-field-unapplied time was as large as 46, and was good.

The end region of the light control film (the region where the light control layer was removed so that the transparent electroconductive film was made naked) was observed with the naked eye. As a result, curves of the transparent electroconductive resin substrates toward the center of the light control film in the thickness direction were extremely small (see FIG. 4). Measurements as described below were made for evaluations of the size of the droplets of the light control suspension in the light control film, the light transmittance of the light control film, the bonding strength between the light control layer and the transparent electroconductive resin substrates, the primer layer film thickness, and the transferability, the tackiness, and the peeling mode of the primer layers.

The results are shown in Table 1.

[Method for Measuring the Size of the Droplets of the Light Control Suspension]

An SEM photograph of the light control film was taken along the direction toward one of the surfaces of the light control film. The diameters of arbitrarily-selected several droplets were measured, and the average value thereof was calculated.

[Method for Measuring the Light Transmittance of the Light Control Film]

A spectroscopic color-difference meter SZ-Σ90 (manufactured by Nippon Denshoku Industries Co., Ltd.) was used to measure the Y value (%) in the state that the used light source was an A light source and the viewing angle was set to 2 degrees. The Y value was defined as the light transmittance. The light transmittance was measured at each of the electric-field-applied time and the electric-field-unapplied time.

[Method for Measuring the Bonding Strength of the Light Control Layer]

The bonding strength was measured, by using a compact desktop tester (precise universal tester), EZ-S, manufactured by Shimadzu Corp. to peel one of the transparent electroconductive resin substrates from the light control layer of the light control film under the following conditions: the peeling angle was 90°, the loading weight was 50 N, and the pulling-up speed was 50 mm/min.

[Method for Measuring the Film Thickness of the Primer Layers]

The film thickness of the primer layers was measured by use of an instantaneous spectrophotometer F-20 (manufactured by Filmetrics Japan, Inc.).

[Method for Evaluating the Transferability]

Any one of the primer layers was put onto a PET surface of an ITO/PET product, and then a weight of about 1 kg was put on the resultant matter. In this state, the matter was stored for one week, and it was checked with the naked eye whether or not the primer layer was transferred on the PET surface of the ITO/PET product. A case where the proportion of the transferred area was 5% or less of the whole of the primer-applied area was evaluated as A; a case where the proportion of the transferred area was from 5 to 30% of the whole of the primer-applied area, B; and a case where the proportion was 30% or more, C.

[Method for Evaluating the Tackiness]

The tackiness of the primer-layer-formed ITO/PET (any one of the primer-layer-formed transparent electroconductive resin substrates produced in Example 1 before the light control layer was formed) was evaluated as follows:

First, a light control material was applied onto the primer-layer-formed ITO/PET (any one of the primer-layer-formed transparent electroconductive resin substrates produced in Example 1 before the light control layer was formed).

When the light control film was produced in a roll-to-roll manner, the following was laminated onto the above-mentioned substrate, on which the light control material had already been formed: the primer-layer-formed ITO/PET (the other primer-layer-formed transparent electroconductive resin substrate produced in Example 1 before the light control layer was formed). At this time, it was necessary to adjust delicately the position of the other primer-layer-formed ITO/PET into a direction perpendicular to the applying direction, so as to put the two onto each other precisely. A case where the position adjustment was able to be easily attained in the state that the primer layer of the other primer-layer-formed ITO/PET contacted a tension-applying metallic roll was evaluated as A; a case where the adjustment was not easily attained but was allowable, B; and a case where the position adjustment was difficult, C.

[Method for Evaluating the Peeling Mode]

About the light control film from which the transparent electroconductive resin substrates were peeled, the film being obtained after the measurement of the bonding strength, the manner that the transparent electroconductive resin substrates were peeled from the light control film was evaluated in accordance with an evaluation criterion decided as described below. A case where the light control layer remained on each of the two transparent electroconductive resin substrates, and at the time of the peeling, the inside of the light control layer was broken was defined as cohesive failure. A case where the light control layer remained on only one of the transparent electroconductive resin substrates, and at the time of the peeling, the light control layer itself was not broken (only the substrates were peeled) was defined as interfacial peeling.

Example 2

A light control film was produced and then the various measurements were made thereabout in the same way as in Example 1 except that: an applicator method was used under a condition that the gap was 10 μm to apply, as the solution at the time of the primer-layer-formation, a liquid dispersion in which 1,6-hexanediol diacrylate (trade name: LIGHT ACRYLATE 1,6HX-A, manufactured by Kyoeisha Chemical Co., Ltd.), $ZrO_2$ and methyl isobutyl ketone were mixed with one another to give proportions of 1.0% by mass, 1.0% by mass and 98% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE 1,6HX-A.

The average particle diameter of $ZrO_2$ was 20 nm. The content thereof by percentage was 50% by mass of the whole of the materials of the primer layer.

The thickness of the primer layer was 8 nm.

Example 3

A light control film was produced and then the various measurements were made thereabout in the same way as in Example 1 except that: an applicator method was used under a condition that the gap was 10 μm to apply, as the solution at the time of the primer-layer-formation, a liquid dispersion in which 1,6-hexanediol diacrylate (trade name: LIGHT ACRYLATE 1,6HX-A, manufactured by Kyoeisha Chemical Co., Ltd.), ITO and methyl isobutyl ketone were mixed with one another to give proportions of 1.0% by mass, 1.0% by mass and 98% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV m at 1000 mJ/cm$^2$ (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE 1,6HX-A.

The average particle diameter of ITO was 30 nm. The content thereof by percentage was 50% by mass of the whole of the materials of the primer layer.

The thickness of the primer layer was 7 nm.

Example 4

A light control film was produced and then the various measurements were made thereabout in the same way as in Example 1 except that: an applicator method was used under a condition that the gap was 10 μm to apply, as the solution at the time of the primer-layer-formation, a liquid dispersion in which neopentyl glycol diacrylate (trade name: LIGHT ACRYLATE NP-A, manufactured by Kyoeisha Chemical Co., Ltd.), $ZrO_2$ and methyl isobutyl ketone were mixed with one another to give proportions of 1.0% by mass, 1.0% by mass and 98% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE NP-A.

The average particle diameter of $ZrO_2$ was 20 nm. The content thereof by percentage was 50% by mass of the whole of the materials of the primer layer.

The thickness of the primer layer was 9 nm.

Example 5

A light control film was produced and then the various measurements were made thereabout in the same way as in Example 1 except that: an applicator method was used under a condition that the gap was 10 μm to apply, as the solution at the time of the primer-layer-formation, a liquid dispersion in which neopentyl glycol diacrylate (trade name: LIGHT ACRYLATE NP-A, manufactured by Kyoeisha Chemical Co., Ltd.), $SiO_2$ and methyl isobutyl ketone were mixed with one another to give proportions of 1.0% by mass, 5.0% by mass and 94% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE NP-A.

The average particle diameter of $SiO_2$ was 30 nm. The content thereof by percentage was 83% by mass of the whole of the materials of the primer layer.

The thickness of the primer layer was 123 nm.

Example 6

A light control film was produced and then the various measurements were made thereabout in the same way as in Example 1 except that: an applicator method was used under a condition that the gap was 10 μm to apply, as the solution at the time of the primer-layer-formation, a liquid dispersion in which tetraethylene glycol diacrylate (trade name: LIGHT ACRYLATE 4EG-A, manufactured by Kyoeisha Chemical Co., Ltd.), $ZrO_2$ and methyl isobutyl ketone were mixed with one another to give proportions of 1.0% by mass, 5.0% by mass and 94% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE 4EG-A.

The average particle diameter of $ZrO_2$ was 20 nm. The content thereof by percentage was 83% by mass of the whole of the materials of the primer layer.

The thickness of the primer layer was 85 nm.

Example 7

A light control film was produced and then the various measurements were made thereabout in the same way as in Example 1 except that: an applicator method was used under a condition that the gap was 10 μm to apply, as the solution at the time of the primer-layer-formation, a liquid dispersion in which tetraethylene glycol diacrylate (trade name: LIGHT ACRYLATE 4EG-A, manufactured by Kyoeisha Chemical Co., Ltd.), $ZrO_2$ and methyl isobutyl ketone were mixed with one another to give proportions of 1.0% by mass, 1.0% by mass and 98% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE 4EG-A.

The average particle diameter of $ZrO_2$ was 20 nm. The content thereof by percentage was 50% by mass of the whole of the materials of the primer layer.

The thickness of the primer layer was 15 nm.

Example 8

Alight control film was produced and then the various measurements were made thereabout in the same way as in Example 1 except that: an applicator method was used under a condition that the gap was 10 μm to apply, as the solution at the time of the primer-layer-formation, a liquid dispersion in which diacrylate of an ethylene oxide adduct of bisphenol A (trade name: LIGHT ACRYLATE BP-10EA, manufactured by Kyoeisha Chemical Co., Ltd.), $ZrO_2$ and methyl isobutyl ketone were mixed with one another to give proportions of 1.0% by mass, 5.0% by mass and 94% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE BP-10EA.

The average particle diameter of $ZrO_2$ was 20 nm. The content thereof by percentage was 83% by mass of the whole of the materials of the primer layer.

The thickness of the primer layer was 91 nm.

Example 9

Alight control film was produced and then the various measurements were made thereabout in the same way as in Example 1 except that: an applicator method was used under a condition that the gap was 10 μm to apply, as the solution at the time of the primer-layer-formation, a liquid dispersion in which 1,6-hexanediol diacrylate (trade name: LIGHT ACRYLATE 1,6HX-A, manufactured by Kyoeisha Chemical Co., Ltd.), GZO and methyl isobutyl ketone were mixed with one another to give proportions of 1.0% by mass, 1.0% by mass and 98% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE 1,6HX-A.

The average particle diameter of GZO was 30 nm. The content thereof by percentage was 50% by mass of the whole of the materials of the primer layer.

The thickness of the primer layer was 12 nm.

Example 10

A light control film was produced and then the various measurements were made thereabout in the same way as in Example 1 except that: an applicator method was used under a condition that the gap was 10 μm to apply, as the solution at the time of the primer-layer-formation, a liquid dispersion in which 1,6-hexanediol diacrylate (trade name: LIGHT ACRYLATE 1,6HX-A, manufactured by Kyoeisha Chemical Co., Ltd.), ZnO and methyl isobutyl ketone were mixed with one another to give proportions of 1.0% by mass, 1.0% by mass and 98% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 1. At this time, a photopolymerization initiator (1-hydroxycyclohexyl phenyl ketone) was added thereto in an amount of 3% by mass of the product LIGHT ACRYLATE 1,6HX-A.

The average particle diameter of ZnO was 20 nm. The content thereof by percentage was 50% by mass of the whole of the materials of the primer layer.

The thickness of the primer layer was 10 nm.

Comparative Example 1

A light control film was produced and then the various measurements were made thereabout in the same way as in Example 1 except that a transparent electroconductive resin substrate made of PET films (300R, manufactured by Toyobo Co., Ltd., thickness: 125 μm) which were each coated with a transparent electroconductive film made of ITO were used, as they were, without forming any primer layer onto each of the films. The results are shown in Table 2.

Comparative Example 2

A light control film was produced and then the various measurements were made thereabout in the same way as in Example 1 except that onto each of transparent electroconductive resin substrates made of PET films which were each coated with a transparent electroconductive film made of ITO, a $SiO_2$ thin film was formed, as a primer layer, by an RF sputtering method (target: $SiO_2$, sputtering gas: a mixture of Ar and $O_2$; mixing flow rate ratio: 29.9/0.1, RF power: 6400 W/m², film-forming temperature: room temperature at the start, and thereafter the substrate temperature was allowed to take its own course without heating the substrate, the film-forming period: 9 minutes). The results are shown in Table 2.

The thickness of the primer layer was 60 nm.

Comparative Example 3

A light control film was produced and then the various measurements were made thereabout in the same way as in Example 1 except that: an applicator method was used under a condition that the gap was 10 μm to apply, as the solution at the time of the primer-layer-formation, a liquid dispersion in which 1,6-hexanediol diacrylate (trade name: LIGHT ACRYLATE 1,6HX-A, manufactured by Kyoeisha Chemical Co., Ltd.) and methyl isobutyl ketone were mixed with each other to give proportions of 1.0% by mass and 99% by mass, respectively, onto the whole surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 2. At this time, a photopolymerization initiator (1-hydroxycyclohexyl phenyl ketone) was added thereto in an amount of 3% by mass of the product LIGHT ACRYLATE 1,6HX-A.

The thickness of the primer layer was 10 nm.

Comparative Example 4

A light control film was produced and then the various measurements were made thereabout in the same way as in Example 1 except that: an applicator method was used under a condition that the gap was 10 μm to apply, as the solution at the time of the primer-layer-formation, a liquid dispersion in which neopentyl glycol diacrylate (trade name: LIGHT ACRYLATE NP-A, manufactured by Kyoeisha Chemical Co., Ltd.) and methyl isobutyl ketone were mixed with each other to give proportions of 1.0% by mass and 99% by mass, respectively, onto the whole surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 2. At this time, a photopolymerization initiator (1-hydroxycyclohexyl phenyl ketone) was added thereto in an amount of 3% by mass of the product LIGHT ACRYLATE NP-A.

The thickness of the primer layer was 7 nm.

Comparative Example 5

Alight control film was produced and then the various measurements were made thereabout in the same way as in Example 1 except that: an applicator method was used under a condition that the gap was 10 μm to apply, as the solution at the time of the primer-layer-formation, a liquid dispersion in which tetraethylene glycol diacrylate (trade name: LIGHT ACRYLATE 4EG-A, manufactured by Kyoeisha Chemical Co., Ltd.) and methyl isobutyl ketone were mixed with each other to give proportions of 1.0% by mass and 99% by mass, respectively, onto the whole surface of the transparent electroconductive of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 2. At this time, a photopolymerization initiator (1-hydroxycyclohexyl phenyl ketone) was added thereto in an amount of 3% by mass of the product LIGHT ACRYLATE 4EG-A.

The thickness of the primer layer was 7 nm.

Comparative Example 6

A light control film was produced and then the various measurements were made thereabout in the same way as in Example 1 except that: an applicator method was used under a condition that the gap was 10 μm to apply, as the solution at the time of the primer-layer-formation, a liquid dispersion in which diacrylate of an ethylene oxide adduct of bisphenol A (trade name: LIGHT ACRYLATE BP-10EA, manufactured by Kyoeisha Chemical Co., Ltd.) and methyl isobutyl ketone were mixed with each other to give proportions of 1.0% by mass and 99% by mass, respectively, onto the whole surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 2. At this time, a photopolymerization initiator (1-hydroxycyclohexyl phenyl ketone) was added thereto in an amount of 3% by mass of the product LIGHT ACRYLATE BP-10EA.

The thickness of the primer layer was 10 nm.

TABLE 1

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 1 | 1,6-HX-A/ZrO$_2$ | 83 | 71 | 46 | 1.0 | 14.6 | ○ | ○ | Cohesive failure |
| Example 2 | 1,6-HX-A/ZrO$_2$ | 50 | 8 | 45 | 0.8 | 13.8 | ○ | ○ | Cohesive failure |
| Example 3 | 1,6-HX-A/ITO | 50 | 7 | 44 | 0.9 | 13.5 | ○ | ○ | Cohesive failure |
| Example 4 | NP-A/ZrO$_2$ | 50 | 9 | 48 | 0.9 | 14.6 | ○ | ○ | Cohesive failure |
| Example 5 | NP-A/SiO$_2$ | 83 | 123 | 46 | 1.1 | 10.8 | ○ | ○ | Cohesive failure |
| Example 6 | 4EG-A/ZrO$_2$ | 83 | 85 | 49 | 1.0 | 11.6 | ○ | ○ | Cohesive failure |
| Example 7 | 4EG-A/ZrO$_2$ | 50 | 15 | 47 | 1.0 | 10.6 | ○ | ○ | Cohesive failure |
| Example 8 | BP-10EA/ZrO$_2$ | 83 | 91 | 49 | 0.9 | 11.4 | ○ | ○ | Cohesive failure |
| Example 9 | 1,6-HX-A/GZO | 50 | 12 | 47 | 1.1 | 10.8 | ○ | ○ | Cohesive failure |
| Example 10 | 1,6-HX-A/ZnO | 50 | 10 | 48 | 1.0 | 11.2 | ○ | ○ | Cohesive failure |

TABLE 2

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Comparative Example 1 | No primer layer | none | — | 46 | 1.1 | 0.5 | ○ | ○ | Interfacial peeling |

TABLE 2-continued

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Comparative Example 2 | SiO$_2$ (Spttering) | none | 60 | 47 | 0.9 | 7.5 | ○ | ○ | Partially interfacial peeling Partially cohesive failure |
| Comparative Example 3 | 1,6-HX-A | none | 10 | 48 | 1.0 | 1.2 | x | Δ | Interfacial peeling |
| Comparative Example 4 | NP-A | none | 7 | 49 | 0.9 | 1.4 | Δ | Δ | Interfacial peeling |
| Comparative Example 5 | 4EG-A | none | 7 | 47 | 1.0 | 1.7 | x | Δ | Interfacial peeling |
| Comparative Example 6 | BP-10EA | none | 10 | 48 | 0.8 | 6.2 | x | Δ | Interfacial peeling |

As shown in Tables 1 and 2, between Examples and Comparative Examples described above, a difference was hardly generated in light transmittance at the time of applying the electric field, and in light transmittance at the time applying no electric field. By contrast, in Comparative Example 1, wherein no primer layer was formed, and Comparative Examples 3 to 6, in each of which primer layers other than the primer layers in the invention were formed, the bonding strength was remarkably small, and a peel was also caused between their transparent electroconductive resin substrates and their light control layer.

In Comparative Example 2, wherein the SiO$_2$ thin films were formed by sputtering, which is a dry process, and the films were used as primer layers, the peeling mode was interface peeling in a partial region thereof, and was cohesive failure in the other region. This suggests that the SiO thin films were not evenly formed.

By contrast, in each of Examples, the primer layers which were each a metal-oxide-fine-particle-containing thin film were used, whereby the bonding strength was largely improved, and a peel was generated completely in a cohesive failure mode. Thus, while light control properties were kept, the adhesiveness was able to be largely and evenly improved.

Example 11

A light control film was produced and then the various measurements were made thereabout in the same way as in Example 1 except that: a micro-gravure method (mesh: #150) was used to apply, as the solution at the time of the primer-layer-formation, a liquid dispersion in which phenyl glycidyl ether acrylate toluene diisocyanate urethane prepolymer (trade name: AT-600, manufactured by Kyoeisha Chemical Co., Ltd.), ZrO$_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 1.0% by mass and a proportion of 97% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZrO$_2$ was 20 nm. The content thereof by percentage was 33.3% by mass of the whole of the materials of the primer layer.

The thickness of the primer layer was 65 nm.

Example 12

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), ZrO$_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.5% by mass and a proportion of 97.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZrO$_2$ was 20 nm. The content thereof by percentage was 20% by mass of the whole of the materials of the primer layer.

The thickness of the primer layer was 59 nm.

Example 13

Alight control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), ZrO$_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.2% by mass and a proportion of 97.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZrO₂ was 20 mm. The content thereof by percentage was 9.1% by mass of the whole of the materials of the primer layer.

The thickness of the primer layer was 62 nm.

Example 14

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), ZrO₂ fine particles (trade name: ZRMIBK15WT %, manufactured by C.I. Kasei Co., Ltd.), and methyl isobutyl ketone were mixed with one another to give a proportion of 2.0% by mass, a solid proportion of 0.1% by mass and a proportion of 97.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZrO₂ was 20 nm. The content thereof by percentage was 4.8% by mass of the whole of the materials of the primer layer.

The thickness of the primer layer was 58 nm.

Example 15

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), ZrO₂ fine particles (trade name: ZRMIBK15WT %, manufactured by C.I. Kasei Co., Ltd.), and methyl isobutyl ketone were mixed with one another to give a proportion of 1.0% by mass, a solid proportion of 0.1% by mass and a proportion of 98.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZrO₂ was 20 nm. The content thereof by percentage was 9.1% by mass of the whole of the materials of the primer layer.

The thickness of the primer layer was 30 nm.

Example 16

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 2.0% by mass, a solid proportion of 1.0% by mass and a proportion of 97% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZnO was 20 nm. The content thereof by percentage was 33.3% by mass of the whole of the materials of the primer layer.

The thickness of the primer layer was 54 nm.

Example 17

A light control film was produced and then the various measurements were made thereabout in the same way as in Example 1 except that: a micro-gravure method (mesh: 4150) was used to apply, as the solution at the time of the primer-layer-formation, a liquid dispersion in which the product AT-600 (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 2.0% by mass, a solid proportion of 0.5% by mass and a proportion of 97.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZnO was 20 nm. The content thereof by percentage was 20% by mass of the whole of the materials of the primer layer.

The thickness of the primer layer was 58 nm.

Example 18

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 2.0% by mass, a solid proportion of 0.2% by mass and a proportion of 97.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 3. At this time, a photopolymerization initiator (1-hydroxycyclohexyl phenyl ketone) was added thereto in an amount of 3% by mass of the product AT-600.

The average particle diameter of ZnO was 20 nm. The content thereof by percentage was 9.1% by mass of the whole of the materials of the primer layer.

The thickness of the primer layer was 55 nm.

Example 19

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), ZnO line particles (trade name: ZNMIBK15WT %, manufactured by C.I. Kasei Co., Ltd.), and methyl isobutyl ketone were mixed with one another to give a proportion of 2.0% by mass, a solid proportion of 0.1% by mass and a proportion of 97.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 ml/cm² (from a metal halide lamp) to photocure the resultant, thereby forming each primer layer. The results are shown in Table 4. At this time, a photopolymerization initiator (1-hydroxycyclohexyl phenyl ketone) was added thereto in an amount of 3% by mass of the product AT-600.

The average particle diameter of ZnO was 20 nm. The content thereof by percentage was 4.8% by mass of the whole of the materials of the primer layer.

The thickness of the primer layer was 59 nm.

Example 20

Alight control film was produced and then the various measurements were made thereabout in the same way as in Example 1 except that: a micro-gravure method (mesh: #150) was used to apply, as the solution at the time of the primer-layer-formation, the product AT-600 (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 1.0% by mass, a solid proportion of 0.1% by mass and a proportion of 98.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 4. At this time, a photopolymerization initiator (1-hydroxycyclohexyl phenyl ketone) was added thereto in an amount of 3% by mass of the product AT-600.

The average particle diameter of ZnO was 20 nm. The content thereof by percentage was 9.1% by mass of the whole of the materials of the primer layer.

The thickness of the primer layer was 28 nm.

Example 21

A light control film was produced and then the various measurements were made thereabout in the same way as in Example 1 except that: a micro-gravure method (mesh: #(50) was used to apply, as the solution at the time of the primer-layer-formation, a liquid dispersion in which the product AT-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 2.0% by mass, a solid proportion of 1.0% by mass and a proportion of 97% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 4. At this time, a photopolymerization initiator (1-hydroxycyclohexyl phenyl ketone) was added thereto in an amount of 3% by mass of the product AT-600.

The average particle diameter of GZO was 30 nm. The content thereof by percentage was 33.3% by mass of the whole of the materials of the primer layer.

The thickness of the primer layer was 54 nm.

Example 22

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 2.0% by mass, a solid proportion of 0.5% by mass and a proportion of 97.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 4. At this time, a photopolymerization initiator (1-hydroxycyclohexyl phenyl ketone) was added thereto in an amount of 3% by mass of the product AT-600.

The average particle diameter of GZO was 30 nm. The content thereof by percentage was 20% by mass of the whole of the materials of the primer layer.

The thickness of the primer layer was 56 nm.

Example 23

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 2.0% by mass, a solid proportion of 0.2% by mass and a proportion of 97.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 4. At this time, a photopolymerization initiator (1-hydroxycyclohexyl phenyl ketone) was added thereto in an amount of 3% by mass of the product AT-600.

The average particle diameter of GZO was 30 nm. The content thereof by percentage was 9.1% by mass of the whole of the materials of the primer layer.

The thickness of the primer layer was 59 mm.

Example 24

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 2.0% by mass, a solid proportion of 0.1% by mass and a proportion of 97.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 4. At this time, a photopolymerization initiator (1-hydroxycyclohexyl phenyl ketone) was added thereto in an amount of 3% by mass of the product AT-600.

The average particle diameter of GZO was 30 nm. The content thereof by percentage was 4.8% by mass of the whole of the materials of the primer layer.

The thickness of the primer layer was 60 nm.

Example 25

A light control film was produced and then the various measurements were made thereabout in the same way as in Example 1 except that: a micro-gravure method (mesh: #150) was used to apply, as the solution at the time of the primer-layer-formation, a liquid dispersion in which the product AT-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 1.0% by mass, a solid proportion of 0.1% by mass and a proportion of 98.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 4. At this time, a photopolymerization initiator (1-hydroxycyclohexyl phenyl ketone) was added thereto in an amount of 3% by mass of the product AT-600.

The average particle diameter of GZO was 30 nm. The content thereof by percentage was 9.1% by mass of the whole of the materials of the primer layer.

The thickness of the primer layer was 31 nm.

Example 26

A light control film was produced and then the various measurements were made thereabout in the same way as in Example 1 except that: a micro-gravure method (mesh: #150) was used to apply, as the solution at the time of the primer-layer-formation, a liquid dispersion in which phenyl glycidyl ether acrylate hexamethylene diisocyanate urethane prepolymer (trade name: AH-600, manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 1.0% by mass, a solid proportion of 1.0% by mass and a proportion of 98.0% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of $ZrO_2$ was 20 nm. The content thereof by percentage was 50% by mass of the whole of the materials of the primer layer.

The thickness of the primer layer was 31 nm.

Example 27

A light control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 1.0% by mass, a solid proportion of 0.5% by mass and a proportion of 98.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of $ZrO_2$ was 20 nm. The content thereof by percentage was 33.3% by mass of the whole of the materials of the primer layer.

The thickness of the primer layer was 28 nm.

Example 28

A light control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 1.0% by mass, a solid proportion of 0.2% by mass and a proportion of 98.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of ZrO$_2$ was 20 nm. The content thereof by percentage was 16.7% by mass of the whole of the materials of the primer layer.

The thickness of the primer layer was 30 nm.

Example 29

A light control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 1.0% by mass, a solid proportion of 1.0% by mass and a proportion of 98.0% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of ZnO was 20 nm. The content thereof by percentage was 50% by mass of the whole of the materials of the primer layer.

The thickness of the primer layer was 29 nm.

Example 30

Alight control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 1.0% by mass, a solid proportion of 0.5% by mass and a proportion of 98.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of ZnO was 20 nm. The content thereof by percentage was 33.3% by mass of the whole of the materials of the primer layer.

The thickness of the primer layer was 27 nm.

Example 31

Alight control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 1.0% by mass, a solid proportion of 0.2% by mass and a proportion of 98.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of ZnO was 20 nm. The content thereof by percentage was 16.7% by mass of the whole of the materials of the primer layer.

The thickness of the primer layer was 27 nm.

Example 32

Alight control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 1.0% by mass, a solid proportion of 1.0% by mass and a proportion of 98.0% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of GZO was 30 nm. The content thereof by percentage was 50% by mass of the whole of the materials of the primer layer.

The thickness of the primer layer was 30 nm.

Example 33

A light control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 1.0% by mass, a solid proportion of 0.5% by mass and a proportion of 98.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 5. At this time, a photopolymerization initiator (1-hydroxycyclohexyl phenyl ketone) was added thereto in an amount of 3% by mass of the product AH-600.

The average particle diameter of GZO was 30 nm. The content thereof by percentage was 33.3% by mass of the whole of the materials of the primer layer.

The thickness of the primer layer was 28 nm.

Example 34

A light control film was produced and then the various measurements were made thereabout in the same way as in Example 1 except that: a micro-gravure method (mesh: #150) was used to apply, as the solution at the time of the primer-layer-formation, a liquid dispersion in which the product AH-600 (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 1.0% by mass, a solid proportion of 0.2% by mass and a proportion of 98.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product AH-600.

The average particle diameter of GZO was 30 nm. The content thereof by percentage was 16.7% by mass of the whole of the materials of the primer layer.

The thickness of the primer layer was 26 nm.

Example 35

A light control film was produced and then the various measurements were made thereabout in the same way as in Example 1 except that: a micro-gravure method (mesh: #150) was used to apply, as the solution at the time of the primer-layer-formation, a liquid dispersion in which dimethylol tricyclodecane diacrylate (trade name: LIGHT ACRYLATE DCP-A, manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 1.0% by mass, a solid proportion of 1.0% by mass and a proportion of 98.0% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product LIGHT ACRYLATE DCP-A.

The average particle diameter of $ZrO_2$ was 20 nm. The content thereof by percentage was 50% by mass of the whole of the materials of the primer layer.

The thickness of the primer layer was 33 nm.

Example 36

A light control film was produced and then the various measurements were made thereabout in the same way as in Example 1 except that: a micro-gravure method (mesh: #150) was used to apply, as the solution at the time of the primer-layer-formation, a liquid dispersion in which the product LIGHT ACRYLATE DCP-A (manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 1.0% by mass, a solid proportion of 0.5% by mass and a proportion of 98.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 ml/cm² (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product LIGHT ACRYLATE DCP-A.

The average particle diameter of $ZrO_2$ was 20 nm. The content thereof by percentage was 33.3% by mass of the whole of the materials of the primer layer.

The thickness of the primer layer was 29 nm.

Example 37

Alight control film was produced and then the various measurements were made thereabout in the same way as in Example 1 except that: a micro-gravure method (mesh: #150) was used to apply, as the solution at the time of the primer-layer-formation, a liquid dispersion in which the product LIGHT ACRYLATE DCP-A (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 1.0% by mass, a solid proportion of 1.0% by mass and a proportion of 98.0% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product LIGHT ACRYLATE DCP-A.

The average particle diameter of ZnO was 20 nm. The content thereof by percentage was 50% by mass of the whole of the materials of the primer layer.

The thickness of the primer layer was 30 nm.

Example 38

A light control film was produced and then the various measurements were made thereabout in the same way as in Example 1 except that: a micro-gravure method (mesh: #150) was used to apply, as the solution at the time of the primer-layer-formation, a liquid dispersion in which the product LIGHT ACRYLATE DCP-A (manufactured by Kyoeisha Chemical Co., Ltd.), ZnO fine particles (trade name: ZNMIBK15WT %, manufactured by C.I. Kasei Co., Ltd.), and methyl isobutyl ketone were mixed with one another to give a proportion of 1.0% by mass, a solid proportion of 0.5% by mass and a proportion of 98.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product LIGHT ACRYLATE DCP-A.

The average particle diameter of ZnO was 20 nm. The content thereof by percentage was 33.3% by mass of the whole of the materials of the primer layer.

The thickness of the primer layer was 28 nm.

Example 39

A light control film was produced and then the various measurements were made thereabout in the same way as in Example 1 except that: a micro-gravure method (mesh: #150) was used to apply, as the solution at the time of the primer-layer-formation, a liquid dispersion in which the product LIGHT ACRYLATE DCP-A (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 1.0% by mass, a solid proportion of 1.0% by mass and a proportion of 98.0% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product LIGHT ACRYLATE DCP-A.

The average particle diameter of GZO was 30 nm. The content thereof by percentage was 50% by mass of the whole of the materials of the primer layer.

The thickness of the primer layer was 33 nm.

Example 40

Alight control film was produced and then the various measurements were made thereabout in the same way as in Example 1 except that: a micro-gravure method (mesh: #150) was used to apply, as the solution at the time of the primer-layer-formation, a liquid dispersion in which the product LIGHT ACRYLATE DCP-A (manufactured by Kyoeisha Chemical Co., Ltd.), GZO fine particles (trade name: GZOMIBK15WT %, manufactured by C.I. Kasei Co., Ltd.), and methyl isobutyl ketone were mixed with one another to give a proportion of 1.0% by mass, a solid proportion of 0.5% by mass and a proportion of 98.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product LIGHT ACRYLATE DCP-A.

The average particle diameter of GZO was 30 nm. The content thereof by percentage was 33.3% by mass of the whole of the materials of the primer layer.

The thickness of the primer layer was 28 nm.

Example 41

A light control film was produced and then the various measurements were made thereabout in the same way as in Example 1 except that: a micro-gravure method (mesh: #150) was used to apply, as the solution at the time of the primer-layer-formation, a liquid dispersion in which the product LIGHT ACRYLATE 1,6HX-A (manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 0.5% by mass, a solid proportion of 5.0% by mass and a proportion of 94.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 6. At this time, a photopolymerization initiator (1-hydroxycyclohexyl phenyl ketone) was added thereto in an amount of 3% by mass of the product LIGHT ACRYLATE 1,6HX-A.

The average particle diameter of $ZrO_2$ was 20 nm. The content thereof by percentage was 90.9% by mass of the whole of the materials of the primer layer.

The thickness of the primer layer was 24 nm.

Comparative Example 7

Alight control film was produced and then the various measurements were made thereabout in the same way as in Example 1 except that: a micro-gravure method (mesh: #150) was used to apply, as the solution at the time of the primer-layer-formation, a solution in which the product AT-600 (manufactured by Kyoeisha Chemical Co., Ltd.) was dissolved in methyl isobutyl ketone to give a proportion of 2.0% by mass, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 7. At this time, a photopolymerization initiator (1-hydroxycyclohexyl phenyl ketone) was added thereto in an amount of 3% by mass of the product AT-600.

The thickness of the primer layer was 68 nm.

Comparative Example 8

A light control film was produced and then the various measurements were made thereabout in the same way as in Example 1 except that: a micro-gravure method (mesh: #150) was used to apply, as the solution at the time of the primer-layer-formation, a solution in which the product AT-600 (manufactured by Kyoeisha Chemical Co., Ltd.) was dissolved in methyl isobutyl ketone to give a proportion of 1.0% by mass, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 7. The results are shown in Table 1.

At this time, a photopolymerization initiator (1-hydroxycyclohexyl phenyl ketone) was added thereto in an amount of 3% by mass of the product AT-600.

The thickness of the primer layer was 27 nm.

Comparative Example 9

A light control film was produced and then the various measurements were made thereabout in the same way as in Example 1 except that: a micro-gravure method (mesh: 4150) was used to apply, as the solution at the time of the primer-layer-formation, a solution in which the product AH-600 (manufactured by Kyoeisha Chemical Co., Ltd.) was dissolved in methyl isobutyl ketone to give a proportion of 2.0% by mass, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 7. At this time, a photopolymerization initiator (1-hydroxycyclohexyl phenyl ketone) was added thereto in an amount of 3% by mass of the product AH-600.

The thickness of the primer layer was 70 nm.

Comparative Example 10

A light control film was produced and then the various measurements were made thereabout in the same way as in Example 1 except that: a micro-gravure method (mesh: #150) was used to apply, as the solution at the time of the primer-layer-formation, a solution in which the product AH-600 (manufactured by Kyoeisha Chemical Co., Ltd.) was dissolved in methyl isobutyl ketone to give a proportion of 1.0% by mass, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 7. At this time, a photopolymerization initiator (1-hydroxycyclohexyl phenyl ketone) was added thereto in an amount of 3% by mass of the product AH-600.

The thickness of the primer layer was 33 nm.

Comparative Example 11

A light control film was produced and then the various measurements were made thereabout in the same way as in Example 1 except that: a micro-gravure method (mesh: #150) was used to apply, as the solution at the time of the primer-layer-formation, a solution in which the product LIGHT ACRYLATE DCP-A (manufactured by Kyoeisha Chemical Co., Ltd.) was dissolved in methyl isobutyl ketone to give a proportion of 2.0% by mass, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 7. At this time, a photopolymerization initiator (1-hydroxycyclohexyl phenyl ketone) was added thereto in an amount of 3% by mass of the product LIGHT ACRYLATE DCP-A.

The thickness of the primer layer was 74 nm.

Comparative Example 12

A light control film was produced and then the various measurements were made thereabout in the same way as in Example 1 except that: a micro-gravure method (mesh: #150) was used to apply, as the solution at the time of the primer-layer-formation, a solution in which the product LIGHT ACRYLATE DCP-A (manufactured by Kyoeisha Chemical Co., Ltd.) was dissolved in methyl isobutyl ketone to give a proportion of 1.0% by mass, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 7. At this time, a photopolymerization initiator (1-hydroxycyclohexyl phenyl ketone) was added thereto in an amount of 3% by mass of the product LIGHT ACRYLATE DCP-A.

The thickness of the primer layer was 35 nm.

Comparative Example 13

A light control film was produced and then the various measurements were made thereabout in the same way as in Example 1 except that: a micro-gravure method (mesh: #150) was used to apply, as the solution at the time of the primer-layer-formation, a $ZrO_2$ fine particle slurry (trade name: ZRMIBK15WT %, manufactured by C.I. Kasei Co., Ltd.), onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 7.

The average particle diameter of $ZrO_2$ was 20 nm. The content thereof by percentage in the whole of the materials of the primer layer was 100% by mass.

The thickness of the primer layer was 128 nm.

Comparative Example 14

A light control film was produced and then the various measurements were made thereabout in the same way as in Example 1 except that: a micro-gravure method (mesh: #150) was used to apply, as the solution at the time of the primer-layer-formation, a ZnO fine particle slurry (trade name: ZNMIBK15WT %, manufactured by C.I. Kasei Co., Ltd.), onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 7.

The average particle diameter of ZnO was 20 nm. The content thereof by percentage in the whole of the materials of the primer layer was 100% by mass.

The thickness of the primer layer was 154 nm.

Comparative Example 15

A light control film was produced and then the various measurements were made thereabout in the same way as in Example 1 except that: a micro-gravure method (mesh: #150) was used to apply, as the solution at the time of the primer-layer-formation, a GZO fine particle slurry (trade name: GZOMIBK15WT %, manufactured by C.I. Kasei Co., Ltd.), onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 7.

The average particle diameter of GZO was 30 nm. The content thereof by percentage in the whole of the materials of the primer layer was 100% by mass.

The thickness of the primer layer was 133 nm.

TABLE 3

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 11 | AT-600/ZrO$_2$ | 33.3 | 65 | 47 | 1.2 | 13.1 | ○ | ○ | Cohesive failure |
| Example 12 | AT-600/ZrO$_2$ | 20 | 59 | 46 | 1.1 | 12.0 | ○ | ○ | Cohesive failure |
| Example 13 | AT-600/ZrO$_2$ | 9.1 | 62 | 49 | 1.2 | 12.5 | ○ | ○ | Cohesive failure |
| Example 14 | AT-600/ZrO$_2$ | 4.8 | 58 | 48 | 1.0 | 11.8 | ○ | ○ | Cohesive failure |
| Example 15 | AT-600/ZrO$_2$ | 9.1 | 30 | 47 | 1.1 | 13.0 | ○ | ○ | Cohesive failure |
| Example 16 | AT-600/ZnO | 33.3 | 54 | 47 | 1.0 | 13.5 | ○ | ○ | Cohesive failure |
| Example 17 | AT-600/ZnO | 20 | 58 | 49 | 1.2 | 11.9 | ○ | ○ | Cohesive failure |
| Example 18 | AT-600/ZnO | 9.1 | 55 | 47 | 1.2 | 12.0 | ○ | ○ | Cohesive failure |

TABLE 4

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 19 | AT-600/ZnO | 4.8 | 59 | 47 | 1.1 | 12.3 | Δ | ○ | Cohesive failure |
| Example 20 | AT-600/ZnO | 9.1 | 28 | 49 | 1.0 | 13.0 | ○ | ○ | Cohesive failure |
| Example 21 | AT-600/GZO | 33.3 | 54 | 48 | 1.1 | 11.9 | ○ | ○ | Cohesive failure |
| Example 22 | AT-600/GZO | 20 | 56 | 47 | 1.1 | 12.5 | ○ | ○ | Cohesive failure |
| Example 23 | AT-600/GZO | 9.1 | 59 | 49 | 1.3 | 12.9 | ○ | ○ | Cohesive failure |
| Example 24 | AT-600/GZO | 4.8 | 60 | 48 | 1.0 | 11.7 | ○ | ○ | Cohesive failure |
| Example 25 | AT-600/GZO | 9.1 | 31 | 48 | 1.1 | 12.7 | ○ | ○ | Cohesive failure |

TABLE 5

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 26 | AH-600/ZrO$_2$ | 50 | 31 | 49 | 1.2 | 13.1 | ○ | ○ | Cohesive failure |
| Example 27 | AH-600/ZrO$_2$ | 33.3 | 28 | 47 | 1.2 | 11.9 | ○ | ○ | Cohesive failure |
| Example 28 | AH-600/ZrO$_2$ | 16.7 | 30 | 48 | 1.1 | 12.2 | ○ | ○ | Cohesive failure |

TABLE 5-continued

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 29 | AH-600/ZnO | 50 | 29 | 47 | 1.2 | 12.7 | ○ | ○ | Cohesive failure |
| Example 30 | AH-600/ZnO | 33.3 | 27 | 47 | 1.3 | 12.1 | ○ | ○ | Cohesive failure |
| Example 31 | AH-600/ZnO | 16.7 | 27 | 49 | 1.1 | 12.8 | ○ | ○ | Cohesive failure |
| Example 32 | AH-600/GZO | 50 | 30 | 48 | 1.1 | 13.2 | ○ | ○ | Cohesive failure |
| Example 33 | AH-600/GZO | 33.3 | 28 | 48 | 1.1 | 12.9 | ○ | ○ | Cohesive failure |

TABLE 6

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 34 | AH-600/GZO | 16.7 | 26 | 47 | 1.2 | 12.9 | ○ | ○ | Cohesive failure |
| Example 35 | DCP-A/ZrO$_2$ | 50 | 33 | 47 | 1.1 | 14.1 | ○ | ○ | Cohesive failure |
| Example 36 | DCP-A/ZrO$_2$ | 33.3 | 29 | 49 | 1.3 | 12.4 | ○ | ○ | Cohesive failure |
| Example 37 | DCP-A/ZnO | 50 | 30 | 48 | 1.2 | 12.5 | ○ | ○ | Cohesive failure |
| Example 38 | DCP-A/ZnO | 33.3 | 28 | 48 | 1.1 | 12.1 | ○ | ○ | Cohesive failure |
| Example 39 | DCP-A/GZO | 50 | 33 | 49 | 1.3 | 11.3 | ○ | ○ | Cohesive failure |
| Example 40 | DCP-A/GZO | 33.3 | 28 | 47 | 1.2 | 12.9 | ○ | ○ | Cohesive failure |
| Example 41 | 1,6-HX-A/ZrO$_2$ | 90.9 | 24 | 49 | 1.1 | 13.1 | ○ | ○ | Cohesive failure |

TABLE 7

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Comparative Example 7 | AT-600 | none | 68 | 49 | 1.2 | 13.3 | x | Δ | Cohesive failure |
| Comparative Example 8 | AT-600 | none | 27 | 47 | 1.0 | 12.9 | Δ | ○ | Cohesive failure |
| Comparative Example 9 | AH-600 | none | 70 | 47 | 1.1 | 8.4 | x | Δ | Mixture of Cohesive failure and Interfacial peeling |
| Comparative Example 10 | AH-600 | none | 33 | 48 | 1.0 | 3.3 | Δ | ○ | Interfacial peeling |
| Comparative Example 11 | DCP-A | none | 74 | 49 | 1.3 | 7.4 | x | x | Mixture of Cohesive failure and Interfacial peeling |
| Comparative Example 12 | DCP-A | none | 35 | 47 | 1.1 | 2.5 | x | x | Interfacial peeling |
| Comparative Example 13 | ZrO$_2$ | 100 | 128 | 48 | 1.2 | 0.8 | ○ | ○ | Interfacial peeling |
| Comparative Example 14 | ZnO | 100 | 154 | 47 | 1.3 | 1.0 | ○ | ○ | Interfacial peeling |
| Comparative Example 15 | GZO | 100 | 133 | 49 | 1.1 | 0.7 | ○ | ○ | Interfacial peeling |

As shown in Tables 3 to 7, in Comparative Examples 7 to 12, wherein primer layers containing no metal oxide fine particles were formed, there was a bonding strength, but problems about the tackiness and the transferability existed. In Comparative Examples 13 to 15, wherein primer layers were each made only of metal oxide fine particles, the tackiness and the transferability were excellent, but the bonding strength was remarkably small, and a peel was also generated between the transparent electroconductive resin substrates and the light control layer.

By contrast, in each of Examples concerned, use was made of primer layers that were each composed of a metal-oxide-fine-particle-containing thin film, whereby the tackiness and the transferability were excellent and a peel was generated completely in a cohesive failure mode. Thus, while light control properties were kept, the adhesiveness was able to be largely and evenly improved.

Example 42

A light control film was produced and then the various measurements were made thereabout in the same way as in Example 1 except that: a micro-gravure method (mesh: #150) was used to apply, as the solution at the time of the primer-layer-formation, a liquid dispersion in which pentaerythritol triacrylate (trade name: ARONIX M-305, manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 1.0% by mass and a proportion of 97% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-305.

The average particle diameter of $ZrO_2$ was 20 nm. The content thereof by percentage was 33.3% by mass of the whole of the materials of the primer layer.

The thickness of the primer layer was 63 nm.

Example 43

A light control film was produced and then the various measurements were made thereabout in the same way as in Example 1 except that: a micro-gravure method (mesh: #150) was used to apply, as the solution at the time of the primer-layer-formation, a liquid dispersion in which the product ARONIX M-305 (manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.5% by mass and a proportion of 97.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-305.

The average particle diameter of $ZrO_2$ was 20 nm. The content thereof by percentage was 20% by mass of the whole of the materials of the primer layer.

The thickness of the primer layer was 61 nm.

Example 44

A light control film was produced and then the various measurements were made thereabout in the same way as in Example 1 except that: a micro-gravure method (mesh: #150) was used to apply, as the solution at the time of the primer-layer-formation, a liquid dispersion in which the product ARONIX M-305 (manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.2% by mass and a proportion of 97.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-305.

The average particle diameter of $ZrO_2$ was 20 nm. The content thereof by percentage was 9.1% by mass of the whole of the materials of the primer layer.

The thickness of the primer layer was 64 nm.

Example 45

A light control film was produced and then the various measurements were made thereabout in the same way as in Example 1 except that: a micro-gravure method (mesh: #150) was used to apply, as the solution at the time of the primer-layer-formation, a liquid dispersion in which the product ARONIX M-305 (manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.1% by mass and a proportion of 97.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-305.

The average particle diameter of $ZrO_2$ was 20 nm. The content thereof by percentage was 4.8% by mass of the whole of the materials of the primer layer.

The thickness of the primer layer was 62 nm.

Example 46

A light control film was produced and then the various measurements were made thereabout in the same way as in Example 1 except that: a micro-gravure method (mesh: #150) was used to apply, as the solution at the time of the primer-layer-formation, a liquid dispersion in which dipentaerythritol pentaacrylate (trade name: ARONIX M-403, manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 1.0% by mass and a proportion of 97% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-403.

The average particle diameter of $ZrO_2$ was 20 nm. The content thereof by percentage as 33.3% by mass of the whole of the materials of the primer layer.

The thickness of the primer layer was 60 nm.

Example 47

A light control film was produced and then the various measurements were made thereabout in the same way as in Example 1 except that: a micro-gravure method (mesh: #150) was used to apply, as the solution at the time of the primer-layer-formation, a liquid dispersion in which the product ARONIX M-403 (manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.5% by mass and a proportion of 97.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-403.

The average particle diameter of $ZrO_2$ was 20 nm. The content thereof by percentage was 20% by mass of the whole of the materials of the primer layer.

The thickness of the primer layer was 57 nm.

Example 48

A light control film was produced and then the various measurements were made thereabout in the same way as in Example 1 except that: a micro-gravure method (mesh: #150) was used to apply, as the solution at the time of the primer-layer-formation, a liquid dispersion in which the product ARONIX M-403 (manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.2% by mass and a proportion of 97.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-403.

The average particle diameter of $ZrO_2$ was 20 nm. The content thereof by percentage was 9.1% by mass of the whole of the materials of the primer layer.

The thickness of the primer layer was 62 nm.

Example 49

A light control film was produced and then the various measurements were made thereabout in the same way as in Example 1 except that: a micro-gravure method (mesh: #150) was used to apply, as the solution at the time of the primer-layer-formation, a liquid dispersion in which the product ARONIX M-403 (manufactured by Toagosei Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.1% by mass and a proportion of 97.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 8. At this time, a photopolymerization initiator (1-hydroxycyclohexyl phenyl ketone) was added thereto in an amount of 3% by mass of the product M-403.

The average particle diameter of $ZrO_2$ was 20 nm. The content thereof by percentage was 4.8% by mass of the whole of the materials of the primer layer.

The thickness of the primer layer was 64 nm.

Example 50

Alight control film was produced and then the various measurements were made thereabout in the same way as in Example 1 except that: a micro-gravure method (mesh: #150) was used to apply, as the solution at the time of the primer-layer-formation, a liquid dispersion in which pentaerythritol triacrylate isophoronediisocyanate urethane prepolymer (trade name: UA-306I, manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 1.0% by mass and a proportion of 97% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm$^2$ (from a metal halide lamp) to photocure the resultant, thereby forming each primer layer. The results are shown in Table 9. At this time, a photopolymerization initiator (1-hydroxycyclohexyl phenyl ketone) was added thereto in an amount of 3% by mass of the product UA-306I.

The average particle diameter of $ZrO_2$ was 20 nm. The content thereof by percentage was 33.3% by mass of the whole of the materials of the primer layer.

The thickness of the primer layer was 64 nm.

Example 51

A light control film was produced and then the various measurements were made thereabout in the same way as in Example 1 except that: a micro-gravure method (mesh: #150) was used to apply, as the solution at the time of the primer-layer-formation, a liquid dispersion in which the product UA-306I (manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.5% by mass and a proportion of 97.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 9. At this time, a photopolymerization initiator (1-hydroxycyclohexyl phenyl ketone) was added thereto in an amount of 3% by mass of the product UA-306I.

The average particle diameter of $ZrO_2$ was 20 nm. The content thereof by percentage was 20% by mass of the whole of the materials of the primer layer.

The thickness of the primer layer was 58 nm.

Example 52

A light control film was produced and then the various measurements were made thereabout in the same way as in Example 1 except that: a micro-gravure method (mesh: #150) was used to apply, as the solution at the time of the primer-layer-formation, a liquid dispersion in which the product UA-306I (manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.2% by mass and a proportion of 97.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV m at 1000 mJ/cm² (from a metal halide lamp) to photocure the resultant, thereby forming each primer layer. The results are shown in Table 9. At this time, a photopolymerization initiator (1-hydroxycyclohexyl phenyl ketone) was added thereto in an amount of 3% by mass of the product UA-306I.

The average particle diameter of $ZrO_2$ was 20 nm. The content thereof by percentage was 9.1% by mass of the whole of the materials of the primer layer.

The thickness of the primer layer was 57 nm.

Example 53

A light control film was produced and then the various measurements were made thereabout in the same way as in Example 1 except that: a micro-gravure method (mesh: #(50) was used to apply, as the solution at the time of the primer-layer-formation, a liquid dispersion in which the product UA-306I (manufactured by Kyoeisha Chemical Co., Ltd.), $ZrO_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.1% by mass and a proportion of 97.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, and then irradiated with UV at 1000 mJ/cm² (from a metal halide lamp) to photocure the resultant, thereby forming each primer layer. The results are shown in Table 9. At this time, a photopolymerization initiator (1-hydroxycyclohexyl phenyl ketone) was added thereto in an amount of 3% by mass of the product UA-306I.

The average particle diameter of $ZrO_2$ was 20 nm. The content thereof by percentage was 4.8% by mass of the whole of the materials of the primer layer.

The thickness of the primer layer was 62 mm.

TABLE 8

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 42 | M-305/$ZrO_2$ | 33.3 | 63 | 48 | 1.2 | 13.5 | ○ | ○ | Cohesive failure |
| Example 43 | M-305/$ZrO_2$ | 20 | 61 | 48 | 1.2 | 13.8 | ○ | ○ | Cohesive failure |
| Example 44 | M-305/$ZrO_2$ | 9.1 | 64 | 46 | 1.0 | 12.9 | ○ | ○ | Cohesive failure |
| Example 45 | M-305/$ZrO_2$ | 4.8 | 62 | 49 | 1.1 | 13.2 | ○ | ○ | Cohesive failure |
| Example 46 | M-403/$ZrO_2$ | 33.3 | 60 | 48 | 1.1 | 12.8 | ○ | ○ | Cohesive failure |
| Example 47 | M-403/ZnO | 20 | 57 | 46 | 1.2 | 12.9 | ○ | ○ | Cohesive failure |
| Example 48 | M-403/$ZrO_2$ | 9.1 | 62 | 49 | 1.0 | 13.6 | ○ | ○ | Cohesive failure |
| Example 49 | M-403/ZnO | 4.8 | 64 | 48 | 1.2 | 13.2 | ○ | ○ | Cohesive failure |

TABLE 9

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 50 | UA-3061/ZrO$_2$ | 33.3 | 64 | 46 | 1.2 | 12.0 | ○ | ○ | Cohesive failure |
| Example 51 | UA-3061/ZrO$_2$ | 20 | 58 | 48 | 1.1 | 12.6 | ○ | ○ | Cohesive failure |
| Example 52 | UA-3061/ZrO$_2$ | 9.1 | 57 | 48 | 1.2 | 13.6 | ○ | ○ | Cohesive failure |
| Example 53 | UA-3061/ZrO$_2$ | 4.8 | 62 | 47 | 1.2 | 12.6 | ○ | ○ | Cohesive failure |

Experimental Example 54

A light control film was produced and then the various measurements were made thereabout in the same way as in Example 1 except that: a micro-gravure method (mesh: #150) was used to apply, as the solution at the time of the primer-layer-formation, a liquid dispersion in which a phosphoric acid diester having a structure illustrated below, PM-21 (manufactured by Nippon Kayaku Co., Ltd.), ZrO$_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 1.0% by mass and a proportion of 97% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, thereby forming each primer layer. The results are shown in Table 10.

The average particle diameter of ZrO$_2$ was 20 nm. The content thereof by percentage was 33.3% by mass of the whole of the materials of the primer layer.

The thickness of the primer layer was 60 nm.

Experimental Example 55

A light control film was produced and then the various measurements were made thereabout in the same way as in Example 1 except that: a micro-gravure method (mesh: #150) was used to apply, as the solution at the time of the primer-layer-formation, a liquid dispersion in which a phosphoric acid diester having a structure illustrated below, PM-21 (manufactured by Nippon Kayaku Co., Ltd.), ZrO$_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.5% by mass and a proportion of 97.5% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, thereby forming each primer layer. The results are shown in Table 10.

The average particle diameter of ZrO$_2$ was 20 nm. The content thereof by percentage was 33.3% by mass of the whole of the materials of the primer layer.

The thickness of the primer layer was 55 nm.

Experimental Example 56

A light control film was produced and then the various measurements were made thereabout in the same way as in Example 1 except that: a micro-gravure method (mesh: #150) was used to apply, as the solution at the time of the primer-layer-formation, a liquid dispersion in which a phosphoric acid diester having the structure illustrated below, PM-21 (manufactured by Nippon Kayaku Co., Ltd.), ZrO$_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.2% by mass and a proportion of 97.8% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, thereby forming each primer layer. The results are shown in Table 10.

The average particle diameter of ZrO$_2$ was 20 nm. The content thereof by percentage was 33.3% by mass of the whole of the materials of the primer layer.

The thickness of the primer layer was 59 nm.

Experimental Example 57

A light control film was produced and then the various measurements were made thereabout in the same way as in Example 1 except that: a micro-gravure method (mesh: #150) was used to apply, as the solution at the time of the primer-layer-formation, a liquid dispersion in which a phosphoric acid diester having the structure illustrated below, PM-21 (manufactured by Nippon Kayaku Co., Ltd.), ZrO$_2$ fine particles (trade name: ZRMIBK15WT %, manufactured by C.I. Kasei Co., Ltd.), and methyl isobutyl ketone were mixed with one another to give a proportion of 2.0% by mass, a solid proportion of 0.1% by mass and a proportion of 97.9% by mass, respectively, onto the entire surface of the transparent electroconductive film of each of the transparent electroconductive resin substrates; and the workpiece was dried at 50° C. for 30 seconds, 60° C. for 30 seconds, and 70° C. for 1 minute, thereby forming each primer layer. The results are shown in Table 10.

The average particle diameter of ZrO$_2$ was 20 nm. The content thereof by percentage was 33.3% by mass of the whole of the materials of the primer layer.

The thickness of the primer layer was 59 nm.

TABLE 10

| Items | Primer material | Content of metal oxide fine particles (% by mass) | Primer film thickness (nm) | Light transmittance when electric field applied (%) | Light transmittance when no electric field applied (%) | Bonding strength (N/m) | Tackiness | Transferability | Peeling mode |
|---|---|---|---|---|---|---|---|---|---|
| Example 54 | PM-21/ZrO$_2$ | 33.3 | 60 | 47 | 1.1 | 14.0 | x | x | Cohesive failure |
| Example 55 | PM-21/ZrO$_2$ | 20 | 55 | 49 | 1.0 | 13.5 | x | x | Cohesive failure |
| Example 56 | PM-21/ZrO$_2$ | 9.1 | 59 | 47 | 1.2 | 13.5 | x | x | Cohesive failure |
| Example 57 | PM-21/ZrO$_2$ | 4.8 | 59 | 48 | 1.2 | 13.7 | x | x | Cohesive failure |

INDUSTRIAL APPLICABILITY

A light control film can be provided, which has a high adhesiveness between its light control layer and its transparent electroconductive resin substrates and exhibits a stable light control function.

EXPLANATION OF REFERENCE NUMERALS

1: light control layer
2: resin matrix
3: droplets
4: transparent electroconductive resin substrates
5a: transparent electroconductive films
5b: transparent resin substrates
6: primer layers
7: power source
8: switch
9: dispersing medium
10: light control particles
11: incident light rays
12: transparent electroconductive film surfaces made naked by removing a light control layer
13: leads through which a voltage is applied to transparent electroconductive films

The invention claimed is:

1. A light control film comprising: two transparent electroconductive resin substrates; and a light control layer sandwiched between the two transparent electroconductive resin substrates,
the light control layer containing: a resin matrix; and a light control suspension dispersed in the resin matrix,
each of the transparent electroconductive resin substrates containing: a transparent resin substrate; and a transparent electroconductive film coated on the transparent resin substrate; and
the light control suspension containing: light control particles; and a dispersing medium in the state the light control particles can flow in the dispersing medium,
wherein at least the transparent electroconductive film of one of the transparent electroconductive resin substrates has, on the light control layer side thereof, a primer layer, and the primer layer is made of a film in which metal oxide fine particles are dispersed in an organic binder resin partially composed of a (meth) acrylate, and
the metal oxide fine particles have an average particle diameter of 100 nm or less.

2. The light control film according to claim 1, wherein the metal oxide fine particles are contained in a proportion of 4.5 to 95% by mass of the entire materials of the primer layer.

3. The light control film according to claim 2, wherein the film thickness of the primer layer is 500 nm or less.

4. The light control film according to claim 1, wherein the primer layer is made of a film obtained by curing a polymerizable monomer or oligomer as the organic binder resin by heat or light.

5. The light control film according to claim 4, wherein the film thickness of the primer layer is 500 nm or less.

6. The light control film according to claim 1, wherein the metal oxide fine particles are selected from the group consisting of ZrO$_2$, SiO$_2$, ITO, GZO, ZnO, and a mixture thereof.

7. The light control film according to claim 6, wherein the film thickness of the primer layer is 500 nm or less.

8. The light control film according to claim 1, wherein the film thickness of the primer layer is 500 nm or less.

9. The light control film according to claim 1, wherein the film thickness of the primer layer is 500 nm or less.

10. The light control film according to claim 1, wherein the metal oxide fine particles have an average particle diameter of 20-30 nm.

11. The light control film according to claim 1, wherein the metal oxide fine particles are selected from the group consisting of ZrO$_2$, SiO$_2$, ITO, GZO, and ZnO, and the metal oxide fine particles have an average particle diameter of 20-30 nm.

12. The light control film according to claim 11, wherein the transparent resin substrate is selected from the group consisting of a polyester film, a polyolefin film, a polyvinyl chloride film, an acrylic resin film, a polyethersulfone film, a polyarylate film, and a polycarbonate film.

13. The light control film according to claim 12, wherein the resin matrix comprises a polymerization product of monomers comprising a silanol-both-terminated siloxane polymer, a trialkylalkoxysilane, and a silane compound containing an ethylenically unsaturated bond.

14. The light control film according to claim 12, wherein the resin matrix comprises a polymerization product of monomers consisting of a silanol-both-terminated siloxane polymer, a trialkylalkoxysilane, and a silane compound containing an ethylenically unsaturated bond.

15. The light control film according to claim 1, wherein the light control film is capable of being wound around a roll.

16. A light control film comprising:
two transparent electroconductive resin substrates, wherein each of the transparent electroconductive resin substrates comprises a transparent resin substrate and a transparent electroconductive film coated on the transparent resin substrate;

a light control layer sandwiched between the two transparent electroconductive resin substrates, wherein the light control layer comprises a resin matrix and a light control suspension dispersed in the resin matrix, and the light control suspension comprises light control particles dispersed in a dispersing medium; and a primer layer disposed between the light control layer and a light control layer side of the transparent electroconductive film of at least one of the transparent electroconductive resin substrates, wherein the primer layer comprises metal oxide fine particles dispersed in an organic binder resin partially composed of a (meth) acrylate, and the metal oxide fine particles have an average particle diameter of 100 nm or less.

17. The light control film according to claim 16, wherein the metal oxide fine particles have an average particle diameter of 20-30 nm.

18. The light control film according to claim 16, wherein the metal oxide fine particles are contained in a proportion of 4.5 to 95% by mass of the entire materials of the primer layer.

19. The light control film according to claim 16, wherein the primer layer is made of a film obtained by curing a polymerizable monomer or oligomer as the organic binder resin by heat or light.

20. The light control film according to claim 16, wherein the metal oxide fine particles are selected from the group consisting of $ZrO_2$, $SiO_2$, ITO, GZO, ZnO, and a mixture thereof.

21. The light control film according to claim 16, wherein the film thickness of the primer layer is 500 nm or less.

22. The light control film according to claim 16, wherein the metal oxide fine particles are selected from the group consisting of $ZrO_2$, $SiO_2$, ITO, GZO, and ZnO, and the metal oxide fine particles have an average particle diameter of 20-30 nm.

23. The light control film according to claim 16, wherein the light control film is capable of being wound around a roll.

* * * * *